US012629302B2

(12) United States Patent     (10) Patent No.: US 12,629,302 B2
Sukumaran et al.              (45) Date of Patent:      May 19, 2026

(54) PATIENT SUPPORT APPARATUSES WITH DISPLAYS

(71) Applicant: Stryker Corporation, Kalamazoo, MI (US)

(72) Inventors: Sujay Sukumaran, Portage, MI (US); Madhu Thomas, London (CA); Tracy Leanne Fried, Kalamazoo, MI (US); Seyed Behrad Ghodsi, Portland, OR (US)

(73) Assignee: Stryker Corporation, Portage, MI (US)

( * ) Notice: Subject to any disclaimer, the term of this patent is extended or adjusted under 35 U.S.C. 154(b) by 93 days.

(21) Appl. No.: 18/565,923

(22) PCT Filed: May 5, 2022

(86) PCT No.: PCT/US2022/027790
§ 371 (c)(1),
(2) Date: Nov. 30, 2023

(87) PCT Pub. No.: WO2022/235878
PCT Pub. Date: Nov. 10, 2022

(65) Prior Publication Data
US 2024/0207119 A1     Jun. 27, 2024

Related U.S. Application Data

(60) Provisional application No. 63/185,410, filed on May 7, 2021.

(51) Int. Cl.
*A61G 7/018*     (2006.01)
*G06F 3/14*      (2006.01)
*G06K 7/14*      (2006.01)
(52) U.S. Cl.
CPC ............... *A61G 7/018* (2013.01); *G06F 3/14* (2013.01); *G06K 7/1417* (2013.01);
(Continued)

(58) Field of Classification Search
CPC ........ A61G 7/00; A61G 7/018; A61G 7/0527; A61G 2203/20; A61G 2203/44;
(Continued)

(56) References Cited

U.S. PATENT DOCUMENTS 6,279,183  B1     8/2001   Kummer et al.
7,154,397  B2    12/2006   Zerhusen et al.
(Continued)

OTHER PUBLICATIONS

International Search Report and Written Opinion, PCT/US22/27790, completed Aug. 23, 2022.
(Continued)

*Primary Examiner* — Laura A Gudorf
(74) *Attorney, Agent, or Firm* — Gardner, Linn, Burkhart & Ondersma LLP

(57)     ABSTRACT

A patient support apparatus includes a support surface adapted to support a person, a display, a plurality of controls, a memory, and a controller. The controller is adapted to collect a batch of data regarding the operation of the patient support apparatus, to store the batch of data in the memory, to update the contents of the batch of data during usage of the patient support apparatus, and to display a coded image on the display in response to activation of a particular control. The coded image, which may be a QR code, encodes the batch of data. The encoded data may include sensor readings, diagnostic data, fault data, a serial number, and/or other data. The controller may also, or alternatively, display (either permanently or semi-permanently) the ward, department, floor, or another identifier (e.g. radiology, maternity, etc.) to which the patient support apparatus is assigned for a particular healthcare facility.

15 Claims, 10 Drawing Sheets

(52) U.S. Cl.
CPC ...... *A61G 2203/20* (2013.01); *A61G 2203/44*
(2013.01); *A61G 2205/60* (2013.01)

(58) Field of Classification Search
CPC .. A61G 2203/60; A61G 2205/60; G06F 3/14;
G06K 7/1417
See application file for complete search history.

(56) References Cited

U.S. PATENT DOCUMENTS

| | | |
|---|---|---|
| 7,434,724 B2 | 10/2008 | Lane |
| 8,334,777 B2 | 12/2012 | Wilson et al. |
| 8,936,190 B2 | 1/2015 | Rothschild |
| 9,044,361 B2 | 6/2015 | Bell et al. |
| 9,569,591 B2 | 2/2017 | Vanderpohl, III |
| 9,734,293 B2 | 8/2017 | Collins, Jr. et al. |
| 10,032,057 B2 | 7/2018 | Burkart et al. |
| 10,070,789 B2 | 9/2018 | Collins, Jr. et al. |
| 10,176,297 B2 | 1/2019 | Zerhusen et al. |
| 10,685,742 B2 | 6/2020 | Walker |
| 10,893,027 B2 | 1/2021 | Khassanov et al. |

| | | | |
|---|---|---|---|
| 2006/0277683 A1 | 12/2006 | Lamire et al. | |
| 2007/0213938 A1* | 9/2007 | Kai | G16H 40/67 |
| | | | 702/19 |
| 2007/0268147 A1 | 11/2007 | Bhai | |
| 2012/0200514 A1 | 8/2012 | Allen | |
| 2012/0310470 A1* | 12/2012 | Holenweg | A61G 5/045 |
| | | | 701/31.5 |
| 2014/0296755 A1* | 10/2014 | Lack | A61G 7/012 |
| | | | 601/149 |
| 2016/0307429 A1* | 10/2016 | Hood | G08B 3/1016 |
| 2018/0369039 A1* | 12/2018 | Bhimavarapu | A61G 7/018 |
| 2020/0121186 A1 | 4/2020 | Collins, Jr. et al. | |
| 2020/0268579 A1 | 8/2020 | Heimbrock et al. | |
| 2020/0312452 A1 | 10/2020 | Durlach et al. | |
| 2020/0345568 A1* | 11/2020 | Heimbrock | G01G 19/52 |
| 2021/0104314 A1 | 4/2021 | Singhal | |

OTHER PUBLICATIONS

"ProCuity Bed Series", Operations Manual, Aug. 2020, 56 Pages, Ref. 3009, Stryker.

* cited by examiner 154    150

154'    150'

| Patient Support Apparatus Data | | | | Usage Statistics | | | Tool Data |
| Serial # | Software | Last 5 Weight Readings (lbs) | Error Code | Lift #1 | Lift #2 | Actuator #1 | Location |
|---|---|---|---|---|---|---|---|
| 1119009101 | V1.001 | 170, 168, 165 169, 171 | ABC (Motor #2; overcurrent) | 15 | 15 | 12 | Room 302, bay A |
| 1119009102 | V1.001 | 133, 134, 133, 136, 136 | — | 333 | 336 | 300 | Room 302, bay B |
| 1119009103 | V1.003 | 150, 155, 154, 155, 156, 156 | XYZ (Load cell #3 voltage error) | 449 | 433 | 677 | Room 303 |
| 1119009104 | V1.001 | 212, 214, 213, 214, 214 | — | 726 | 724 | 497 | Room 304 |
| 1119009105 | V1.002 | 189, 190, 190, 188, 189 | — | 222 | 211 | 298 | Room 305 |

166a  166b  166c  166d  166e 164a  164b  164c  164d  164e  164f  164g  164h 160    162

PATIENT SUPPORT APPARATUSES WITH DISPLAYS

CROSS-REFERENCE TO RELATED APPLICATIONS

This application claims priority to U.S. provisional patent application Ser. No. 63/185,410 filed May 7, 2021, by inventors Sujay Sukumaran et al. and entitled PATIENT SUPPORT APPARATUSES WITH DISPLAYS, the complete disclosure of which is incorporated herein by reference.

BACKGROUND

The present disclosure relates to patient support apparatuses, such as beds, cots, stretchers, recliners, or the like, that include displays, such as LCD displays, or the like.

Existing hospital beds and/or stretchers often include one or more sensors and/or circuits that sense data about the patient support apparatus during their usage. Such data may be desirably communicated off the bed for analysis, such as for servicing purposes, diagnostic purposes, and/or other purposes. In many instances, such data must be either manually copied from one or more display screens on the display of the bed or stretcher, or an electronic device has to be coupled by a cable or a radio to the bed or stretcher in order to read the data.

In addition, existing hospital beds and/or stretchers are often assigned to specific units of a healthcare facility, such as department, ward, floor, building, or the like. However, these beds and/or stretchers are often moved through the healthcare facility at different times, and they tend to end up in areas of the healthcare facility to which they are not assigned.

SUMMARY

According to various embodiments, the present disclosure provides an improved patient support apparatus for easily communicating data to an off-board computer without requiring the user to manually copy the data from a display screen of the patient support apparatus, as well as without requiring the user to wirelessly pair an electronic device to the patient support apparatus. In some embodiments, the patient support apparatus encodes this data in an image displayed on its display, such as a QR code, and thereby enables the data to be transferred to another computer through the capture of this code by a camera. Alternatively, or additionally, the present disclosure provides, in some embodiments, a patient support apparatus that permanently, or semi-permanently, displays a hospital identifier on its display so that if the patient support apparatus is moved to an area of the hospital to which it is not assigned, it can be easily noticed and returned to its correct location within the hospital. These and other features of the present disclosure will become apparent to those skilled in the art in light of the following written description and accompanying drawings.

According to one embodiment of the present disclosure, a patient support apparatus is provided that includes a support surface, a sensor, a display, a plurality of controls, a memory, and a controller. The support surface is adapted to support a person thereon. The plurality of controls includes at least one image control. The controller is adapted to communicate with the sensor, the display, the plurality of controls, and the memory. The controller is further adapted to store sensor data derived from the sensor in the memory, and to display a coded image on the display in response to activation of the image control. The coded image encodes the sensor data.

In some embodiments, the memory further includes a unique identifier associated with the patient support apparatus and the controller is further adapted to encode the unique identifier in the coded image.

The unique identifier, in some embodiments, corresponds to a serial number of the patient support apparatus.

The coded image, in some embodiments, is a Quick Response (QR) code.

The sensor, in some embodiments, is a scale adapted to detect a weight of a patient supported on the support surface, and the sensor data includes a weight reading of the patient. In some of these embodiments, the controller is further adapted to store a plurality of weight readings from the scale, and to encode the plurality of weight readings in the coded image. The controller may be further adapted to automatically select the plurality of weight readings from a set of weight readings, wherein the plurality of weight readings are the most recent weight reading in the set of weight readings.

The patient support apparatus, in some embodiments, further includes a second sensor in communication with the controller. In such embodiments, the controller is further adapted to store second sensor data derived from the second sensor in the memory and to encode the second sensor data in the coded image.

The controller, in some embodiments, is adapted to detect a fault in an operation of the patient support apparatus and to encode information about the fault in the coded image.

The controller, in some embodiments, is further adapted to perform the following: (a) display a home screen on the display after the patient support apparatus is initially powered on; (b) display a non-home screen on the display in response to a user activating at least one of the plurality of controls on the patient support apparatus; and (c) automatically return to displaying the home screen after displaying the non-home screen in response to a lack of input from the user for more than a predetermined amount of time.

In some embodiments, the controller is further configured to display an identifier of the patient support apparatus on the home screen. The identifier, in some embodiments, corresponds to at least one of the following: a department of a healthcare facility to which the patient support apparatus is assigned; a floor of a multi-floor building to which the patient support apparatus is assigned; a healthcare facility building to which the patient support apparatus is assigned; a wing of a healthcare facility to which the patient support apparatus is assigned; a healthcare facility name; or another unit of the healthcare facility to which the patient support apparatus is assigned.

The patient support apparatus, in some embodiments, includes a network transceiver in communication with the controller, and the controller is adapted to change the identifier in response to receiving a message from a healthcare facility computer network via the network transceiver. In some of these embodiments, the controller is adapted to change the identifier only in response to receiving a message from the healthcare facility computer network via the network transceiver, and the patient support apparatus includes no controls onboard adapted to allow the user to change the identifier. Alternatively, the controller may be adapted to allow the user to change the identifier in response to the user activating at least a subset of the plurality of controls in a predetermined combination. In some of these embodiments, the patient support apparatus does not display the predetermined combination on the display or elsewhere on the patient support apparatus, thereby helping to maintain the predetermined combination as a technician's secret.

According to another embodiment of the present disclosure, a patient support apparatus is provided that includes a support surface, a display, a plurality of controls, a memory, and a controller. The support surface is adapted to support a person thereon. The plurality of controls include at least one image control. The controller is adapted to communicate with the display, the plurality of controls and the memory. The controller is further adapted to collect a batch of data regarding operation of the patient support apparatus, to store the batch of data in the memory, to update a content of the batch of data during usage of the patient support apparatus, and to display a coded image on the display in response to activation of the image control. The coded image encodes the batch of data.

In some embodiments, the memory further includes a unique identifier associated with the patient support apparatus and the controller is further adapted to encode the unique identifier in the coded image. The unique identifier may correspond to a serial number of the patient support apparatus.

In some embodiments, the coded image is a QR code.

In some embodiments, the patient support apparatus further includes a scale adapted to detect a weight of a patient supported on the support surface, and the batch of data includes a weight reading from the scale.

The controller, in some embodiments, is adapted to include a plurality of weight readings from the scale in the batch of data. In such embodiments, the scale may be further adapted to automatically select the plurality of weight readings from a set of weight readings, wherein the plurality of weight readings are the most recent weight readings in the set of weight readings.

The patient support apparatus, in some embodiments, includes a plurality of sensors and the controller is further adapted to include sensor data derived from the plurality of sensors in the batch of data.

In some embodiments, the controller is further adapted to detect a fault in an operation of the patient support apparatus and to include fault data in the batch of data.

The controller, in some embodiments, is further adapted to perform the following: (a) display a home screen on the display after the patient support apparatus is initially powered on; (b) display a non-home screen on the display in response to a user activating at least one of the plurality of controls on the patient support apparatus; and (c) automatically return to displaying the home screen after displaying the non-home screen in response to a lack of activation of the plurality of controls for more than a predetermined amount of time. In such embodiments, the controller may further be configured to display an identifier of the patient support apparatus on the home screen.

In some embodiments, the identifier corresponds to at least one of the following: a department of a healthcare facility to which the patient support apparatus is assigned; a floor of a multi-floor building to which the patient support apparatus is assigned; a healthcare facility building to which the patient support apparatus is assigned; a wing of a healthcare facility to which the patient support apparatus is assigned; a healthcare facility name; or some other unit of the healthcare facility to which the patient support apparatus is assigned.

The patient support apparatus, in some embodiments, includes a network transceiver in communication with the controller, and the controller is adapted to change the identifier in response to receiving a message from a healthcare facility computer network via the network transceiver. In some of these embodiments, the controller is adapted to change the identifier only in response to receiving a message from the healthcare facility computer network via the network transceiver, and the patient support apparatus includes no controls onboard adapted to allow the user to change the identifier. Alternatively, the controller may be adapted to allow the user to change the identifier in response to the user activating at least a subset of the plurality of controls in a predetermined combination. In some of these embodiments, the patient support apparatus does not display the predetermined combination on the display or elsewhere on the patient support apparatus.

According to another embodiment of the present disclosure, a patient support apparatus is provided that includes a support surface, a display, a plurality of controls, and a controller. The support surface is adapted to support a person thereon. The controller is adapted to communicate with the display and the plurality of controls. The controller is further adapted to perform the following: (a) display a home screen on the display after the patient support apparatus is initially powered on; (b) display a non-home screen on the display in response to a user activating at least one of the plurality of controls on the patient support apparatus; (c) automatically return to displaying the home screen after displaying the non-home screen in response to a lack of activation of the plurality of controls; and (d) display an identifier of the patient support apparatus on the home screen.

The identifier, in some embodiments, corresponds to at least one of the following: a department of a healthcare facility to which the patient support apparatus is assigned; a floor of a multi-floor building to which the patient support apparatus is assigned; a healthcare facility building to which the patient support apparatus is assigned; a wing of a healthcare facility to which the patient support apparatus is assigned; a healthcare facility name; or some other unit of the healthcare facility to which the patient support apparatus is assigned.

The patient support apparatus, in some embodiments, includes a network transceiver in communication with the controller, and the controller is adapted to change the identifier in response to receiving a message from a healthcare facility computer network via the network transceiver. In some of these embodiments, the controller is adapted to change the identifier only in response to receiving a message from the healthcare facility computer network via the network transceiver, and the patient support apparatus includes no controls onboard adapted to allow the user to change the identifier. Alternatively, the controller may be adapted to allow the user to change the identifier in response to the user activating at least a subset of the plurality of controls in a predetermined combination. In some of these embodiments, the patient support apparatus does not display the predetermined combination on the display or elsewhere on the patient support apparatus.

The patient support apparatus further includes a memory, in some embodiments. The controller, in such embodiments, is further adapted to collect a batch of data regarding operation of the patient support apparatus, to store the batch of data in the memory, to update a content of the batch of data during usage of the patient support apparatus, and to display a coded image on the display in response to activation of an image control, wherein the image control is one of the plurality of controls and the coded image encodes the batch of data.

The coded image, in some embodiments, further includes a unique identifier associated with the patient support apparatus and the controller is further adapted to encode the unique identifier in the coded image. The unique identifier may be different from the identifier displayed on the home screen.

In some embodiments, the unique identifier corresponds to a serial number of the patient support apparatus.

In some embodiments, the coded image is a Quick Response (QR) code.

In some embodiments, the patient support apparatus further includes a scale adapted to detect a weight of a patient supported on the support surface, and wherein the batch of data includes a weight reading from the scale.

The controller, in some embodiments, is adapted to include a plurality of weight readings from the scale in the batch of data. In such embodiments, the scale may be further adapted to automatically select the plurality of weight readings from a set of weight readings, wherein the plurality of weight readings are the most recent weight readings in the set of weight readings.

The patient support apparatus, in some embodiments, includes a plurality of sensors and the controller is further adapted to include sensor data derived from the plurality of sensors in the batch of data.

In some embodiments, the controller is further adapted to detect a fault in an operation of the patient support apparatus and to include fault data in the batch of data.

In any of the embodiments, the patient support apparatus may be a bed, a stretcher, a cot, or a recliner.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
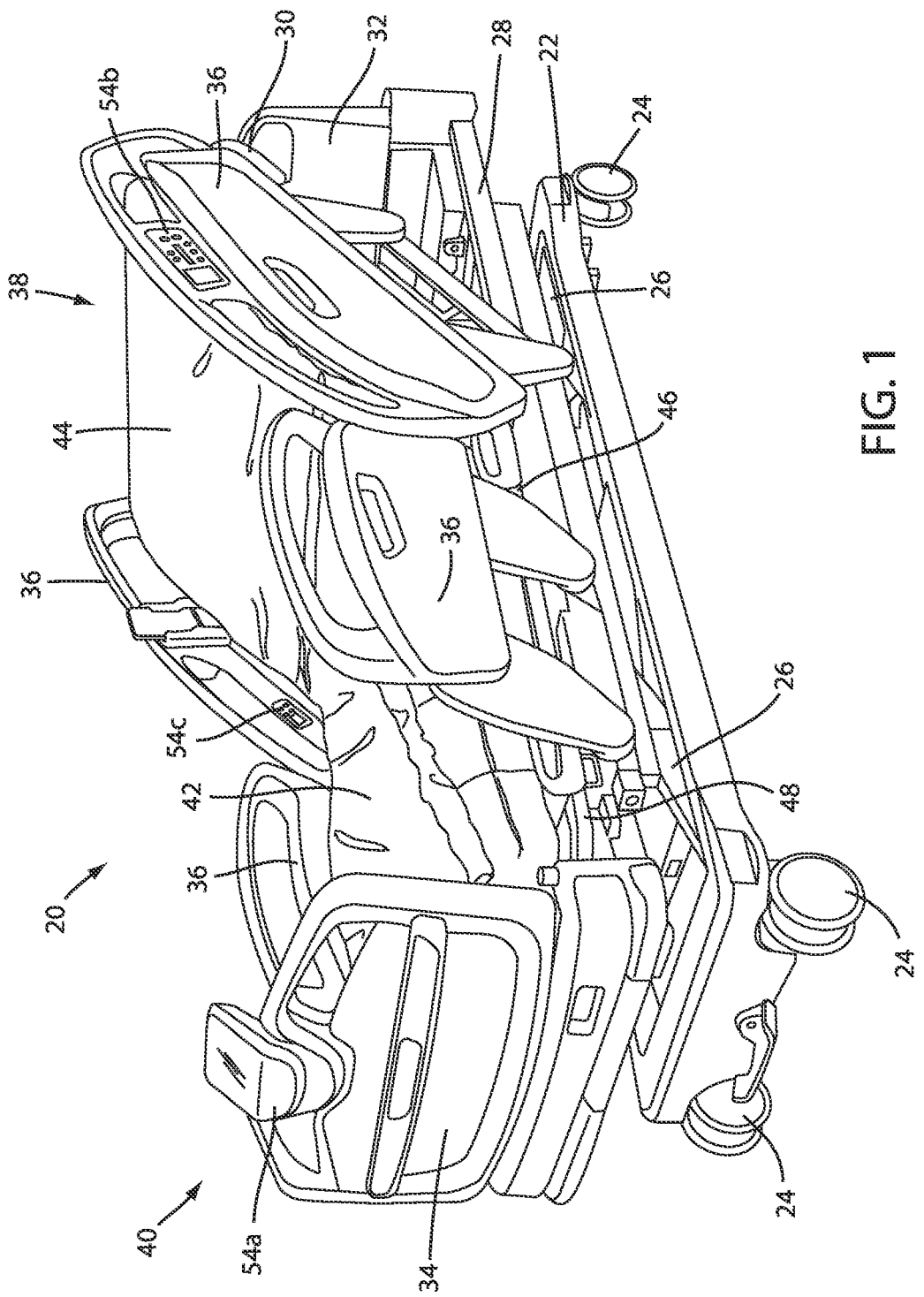
FIG. 1 is a perspective view of a patient support apparatus according to a first embodiment of the present disclosure.

An illustrative patient support apparatus 20 according to a first embodiment of the present disclosure is shown in FIG. 1. Although the particular form of patient support apparatus 20 illustrated in FIG. 1 is a bed adapted for use in a hospital or other medical setting, it will be understood that patient support apparatus 20 could, in different embodiments, be a cot, a stretcher, a recliner, or any other structure capable of supporting a patient in a healthcare environment.

In general, patient support apparatus 20 includes a base 22 having a plurality of wheels 24, a pair of lifts 26 supported on the base 22, a litter frame 28 supported on the lifts 26, and a support deck 30 supported on the litter frame 28. Patient support apparatus 20 further includes a headboard 32, a footboard 34 and a plurality of siderails 36. Siderails 36 are all shown in a raised position in FIG. 1 but are each individually movable to a lower position in which ingress into, and egress out of, patient support apparatus 20 is not obstructed by the lowered siderails 36.

Lifts 26 are adapted to raise and lower litter frame 28 with respect to base 22. Lifts 26 may be hydraulic actuators, electric actuators, or any other suitable device for raising and lowering litter frame 28 with respect to base 22. In the illustrated embodiment, lifts 26 are operable independently so that the tilting of litter frame 28 with respect to base 22 can also be adjusted, to place the litter frame 28 in a flat or horizontal orientation, a Trendelenburg orientation, or a reverse Trendelenburg orientation. That is, litter frame 28 includes a head end 38 and a foot end 40, each of whose height can be independently adjusted by the nearest lift 26. Patient support apparatus 20 is designed so that when an occupant lies thereon, his or her head will be positioned adjacent head end 38 and his or her feet will be positioned adjacent foot end 40.

Litter frame 28 provides a structure for supporting support deck 30, the headboard 32, footboard 34, and siderails 36.

Support deck 30 provides a support surface for a mattress 42, or other soft cushion, so that a person may lie and/or sit thereon. Support deck 30 is made of a plurality of sections, some of which are pivotable about generally horizontal pivot axes. In the embodiment shown in FIG. 1, support deck 30 includes at least a head section 44, a thigh section 46, and a foot section 48, all of which are positioned underneath mattress 42 and which generally form flat surfaces for supporting mattress 42. Head section 44, which is also sometimes referred to as a Fowler section, is pivotable about a generally horizontal pivot axis between a generally horizontal orientation (not shown in FIG. 1) and a plurality of raised positions (one of which is shown in FIG. 1). Thigh section 46 and foot section 48 may also be pivotable about generally horizontal pivot axes.

In some embodiments, patient support apparatus 20 may be modified from what is shown to include one or more components adapted to allow the user to extend the width of patient support deck 30, thereby allowing patient support apparatus 20 to accommodate patients of varying sizes. When so modified, the width of deck 30 may be adjusted sideways in any increments, for example between a first or minimum width, a second or intermediate width, and a third or expanded/maximum width.

As used herein, the term "longitudinal" refers to a direction parallel to an axis between the head end 38 and the foot end 40. The terms "transverse" or "lateral" refer to a direction perpendicular to the longitudinal direction and parallel to a surface on which the patient support apparatus 20 rests.

It will be understood by those skilled in the art that patient support apparatus 20 can be designed with other types of general mechanical constructions, such as, but not limited to, that described in commonly assigned, U.S. Pat. No. 10,130,536 to Roussy et al., entitled PATIENT SUPPORT USABLE WITH BARIATRIC PATIENTS, the complete disclosure of which is incorporated herein by reference. In another embodiment, the general mechanical construction of patient support apparatus 20 may be the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that patient support apparatus 20 can be designed with still other types of general mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of patient support apparatus 20 may also take on still other forms different from what is disclosed in the aforementioned references.

Patient support apparatus 20 further includes a plurality of control panels 54 that enable a user of patient support apparatus 20, such as a patient and/or an associated caregiver, to control one or more aspects of patient support apparatus 20. In the embodiment shown in FIG. 1, patient support apparatus 20 includes a footboard control panel 54a, a pair of outer siderail control panels 54b (only one of which is visible), and a pair of inner siderail control panels 54c (only one of which is visible). Footboard control panel 54a and outer siderail control panels 54b are intended to be used by caregivers, or other authorized personnel, while inner siderail control panels 54c are intended to be used by the patient associated with patient support apparatus 20. Each of the control panels 54 includes a plurality of controls 50 (see, e.g. FIG. 2), although each control panel 54 does not necessarily include the same controls and/or functionality.

Among other functions, controls 50 of control panel 54a allow a user to control one or more of the following: change a height of support deck 30, raise or lower head section 44, activate and deactivate a brake for wheels 24, arm and disarm an exit detection system, take a weight reading of the patient, zero the scale, cause a coded image of data to be displayed thereon, and or other activities. One or both of the inner siderail control panels 54c also include at least one control that enables a patient to call a remotely located nurse (or other caregiver). In addition to the nurse call control, one or both of the inner siderail control panels 54c also include one or more controls for controlling one or more features of one or more room devices positioned within the same room as the patient support apparatus 20, such as a television, a reading light, and/or a room light. With respect to the television, the features that may be controllable by one or more controls 50 on control panel 54c include, but are not limited to, the volume, the channel, the closed-captioning, and/or the power state of the television. With respect to the room and/or night lights, the features that may be controlled by one or more controls 50 on control panel 54c include the on/off state and/or the brightness level of these lights.

Control panel 54a includes a display 52 (FIG. 2) configured to display a plurality of different screens thereon. Surrounding display 52 are a plurality of navigation controls 50a-f that, when activated, cause the display 52 to display different screens on display 52. More specifically, when a user presses navigation control 50a, control panel 54a displays an exit detection control screen on display 52 that includes one or more icons that, when touched, control an onboard exit detection system. The exit detection system is as adapted to issue an alert when a patient exit from patient support apparatus 20. Such an exit detection system may include any of the features and functions as, and/or may be constructed in any of the same manners as, the exit detection system disclosed in commonly assigned U.S. patent application 62/889,254 filed Aug. 20, 2019, by inventors Sujay Sukumaran et al. and entitled PERSON SUPPORT APPARATUS WITH ADJUSTABLE EXIT DETECTION ZONES, the complete disclosure of which is incorporated herein by reference.

When a user presses navigation control 50b (FIG. 2), control panel 54 displays a monitoring control screen that includes a plurality of control icons that, when touched, control an onboard monitoring system built into patient support apparatus 20. Further details of one type of monitoring system that may be built into patient support apparatus 20 are disclosed in commonly assigned U.S. patent application Ser. No. 62/864,638 filed Jun. 21, 2019, by inventors Kurosh Nahavandi et al. and entitled PATIENT SUPPORT APPARATUS WITH CAREGIVER REMINDERS, as well as commonly assigned U.S. patent application Ser. No. 16/721,133 filed Dec. 19, 2019, by inventors Kurosh Nahavandi et al. and entitled PATIENT SUPPORT APPARATUSES WITH MOTION CUSTOMIZATION, the complete disclosures of both of which are incorporated herein by reference.

When a user presses navigation control 50c, control panel 54a displays a scale control screen that includes a plurality of control icons that, when touched, control the scale system of patient support apparatus 20. Such a scale system may include any of the features and functions as, and/or may be constructed in any of the same manners as, the scale systems disclosed in commonly assigned U.S. patent application 62/889,254 filed Aug. 20, 2019, by inventors Sujay Sukumaran et al. and entitled PERSON SUPPORT APPARATUS WITH ADJUSTABLE EXIT DETECTION ZONES, and U.S. patent application Ser. No. 62/885,954 filed Aug. 13, 2019, by inventors Kurosh Nahavandi et al. and entitled PATIENT SUPPORT APPARATUS WITH EQUIPMENT WEIGHT LOG, the complete disclosures of both of which are incorporated herein by reference. In some embodiments, the scale system uses the same force sensors that are used in the exit detection system, although it will be understood that the scale and the exit detection system may be completely separate in other embodiments.

When a user presses navigation control 50d, control panel 54 displays a motion control screen that includes a plurality of control icons that, when touched, control the movement of various components of patient support apparatus 20, such as, but not limited to, the height of litter frame 28 and the pivoting of head section 44. In some embodiments, the motion control screen displayed on display 52 in response to pressing control 50d may be the same as, or similar to, the screen shown in FIG. 4.

When a user presses navigation control 50e, control panel 54a displays a motion lock control screen that includes a plurality of control icons that, when touched, control one or more motion lockout functions of patient support apparatus 20. Such a motion lockout screen may include any of the features and functions as, and/or may be constructed in any of the same manners as, the motion lockout features, functions, and constructions disclosed in commonly assigned U.S. patent application Ser. No. 16/721,133 filed Dec. 19, 2019, by inventors Kurosh Nahavandi et al. and entitled PATIENT SUPPORT APPARATUSES WITH MOTION CUSTOMIZATION, the complete disclosure of which is incorporated herein by reference.

When a user presses on navigation control 50f, control panel 54a displays a menu screen that includes a plurality of menu icons that, when touched, bring up one or more additional screens for controlling and/or viewing one or more other aspects of patient support apparatus 20. Such other aspects include, but are not limited to, diagnostic and/or service information for patient support apparatus 20, mattress control and/or status information, configuration settings, and other settings and/or information. One example of a suitable menu screen is the menu screen 100 disclosed in commonly assigned U.S. patent application Ser. No. 62/885,953 filed Aug. 13, 2019, by inventors Kurosh Nahavandi et al. and entitled PATIENT SUPPORT APPARATUS WITH TOUCHSCREEN, the complete disclosure of which is incorporated herein by reference. In some embodiments, the activation of navigation control 50f leads to, either directly or indirectly, the display of an image control (see image control 50w discussed below with respect to FIG. 10) that, as will be explained in greater detail below, causes patient support apparatus 20 to display one or more image codes, such as QR codes, on display 52.

For all of the navigation controls 50a-f (FIG. 2), screens other than the ones specifically mentioned above may be displayed on display 52 in other embodiments of patient support apparatus 20 in response to a user pressing these controls. Thus, it will be understood that the specific screens mentioned above are merely representative of the types of screens that are displayable on display 52 in response to a user pressing on one or more of navigation controls 50a-f. It will also be understood that, although navigation controls 50a-f have all been illustrated in the accompanying drawings as dedicated controls that are positioned adjacent display 52, any one or more of these controls 50a-f could alternatively, or additionally, be touchscreen controls that are displayed at one or more locations on display 52. Still further, although controls 50a-f have been shown herein as buttons, it will be understood that any of controls 50a-f could also, or alternatively, be switches, dials, or other types of non-button controls.

It will also be understood that, in some embodiments, any one or more of control panels 54a-c may include any one or more of the controls 50g-t disclosed in commonly assigned U.S. patent application Ser. No. 63/131,508 filed Dec. 29, 2020 by inventors Kirby Neihouser et al. and entitled TOOL FOR CONFIGURING HEADWALL UNITS USED FOR PATIENT SUPPORT APPARATUS COMMUNICATION, the complete disclosure of which is incorporated herein by reference.

Figure 3:
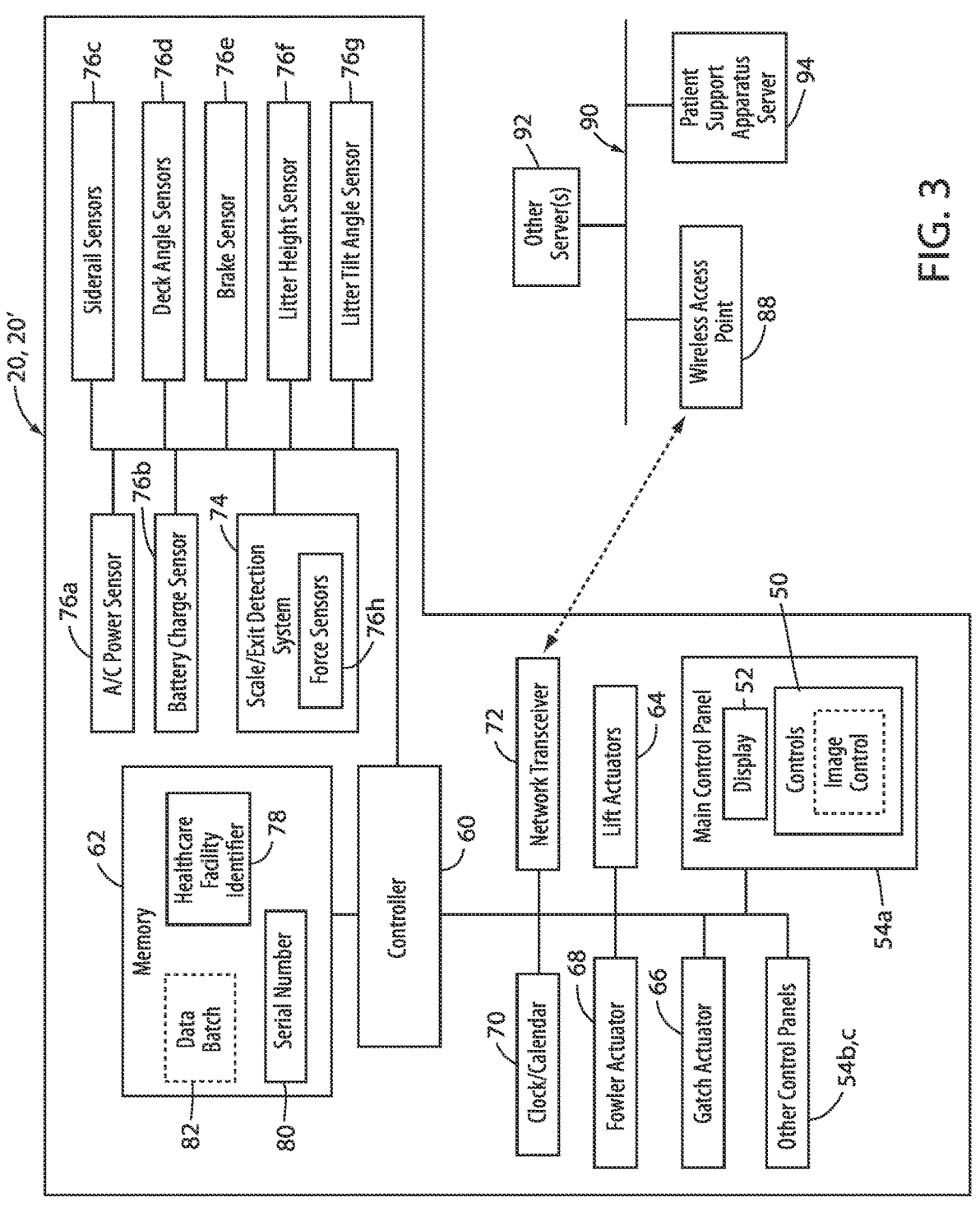
FIG. 3 is a block diagram of several of the internal components of the patient support apparatus of FIG. 1 (or FIG. 6), as well as a local area network of a healthcare facility in which the patient support apparatus may be positioned.

FIG. 3 illustrates various internal components of patient support apparatus 20, as well as a healthcare facility computer network 90 that may be present in the healthcare facility in which patient support apparatus 20 is located. It will be understood that the components of patient support apparatus 20 shown in FIG. 3 are merely an illustrative example of components that may be included within patient support apparatus 20 and that some embodiments of patient support apparatus 20 will include fewer components than what is shown in FIG. 3, and that other embodiments of patient support apparatus 20 will include more components than what is shown in FIG. 3.

The components of patient support apparatus 20 shown in FIG. 3 include a controller 60, a memory 62, a pair of lift actuators 64, a gatch actuator 66, a Fowler actuator 68, a clock/calendar timer 70, a network transceiver 72, a scale/exit detection system 74, and a plurality of sensors 76. In some embodiments, the sensors 76 include one or more of the following: an A/C power sensor 76a, a battery charge sensor 76b, a plurality of siderails sensors 76c, a deck angle sensor 76d, a brake sensor 76e, a litter height sensor 76f, a litter tilt angle sensor 76g, and/or a plurality of force sensors 76h. Other combinations of sensors can, of course, be implemented on patient support apparatus 20.

Controller 60 (FIG. 3) is constructed of any electrical component, or group of electrical components, that are capable of carrying out the functions described herein. In many embodiments, controller 60 is a conventional microcontroller, or group of conventional microcontrollers, although not all such embodiments need include a microcontroller. In general, controller 60 includes any one or more microprocessors, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units as part of an embedded network. When implemented to include an embedded network, the embedded network may include multiple nodes that communicate using one or more of the following: a Controller Area Network (CAN); a Local Interconnect Network (LIN); an I-squared-C serial communications bus; a serial peripheral interface (SPI) communications bus; any of RS-232, RS-422, and/or RS-485 communication interfaces; a LonWorks network, and/or an Ethernet. When controller 60 is implemented to communicate using an on-board Ethernet, the on-board Ethernet may be designed in accordance with any of the Ethernet-carrying patient support apparatuses disclosed in commonly assigned U.S. patent application Ser. No. 14/622,221 filed Feb. 13, 2015, by inventors Krishna Bhimavarapu et al. and entitled COMMUNICATION METHODS FOR PATIENT HANDLING DEVICES, the complete disclosure of which is incorporated herein by reference. In some embodiments, controller 60 may be implemented to include multiple nodes that communicate with each other utilizing different communication protocols. In such embodiments, controller 60 may be implemented in accordance with any of the embodiments disclosed in commonly assigned U.S. patent application Ser. No. 15/903,477 filed Feb. 23, 2018, by inventors Krishna Bhimavarapu et al. and entitled PATIENT CARE DEVICES WITH ON-BOARD NETWORK COMMUNICATION, the complete disclosure of which is incorporated herein by reference.

The instructions followed by controller 60 in carrying out the functions described herein, as well as the data necessary for carrying out these functions, are stored in memory 62, and/or in one or more other memories accessible to the one or more microprocessors, microcontrollers, or other programmable components of controller 60. Controller 60 is adapted to store in memory 62 a healthcare facility identifier 78 that identifies the department, floor, building, ward, or other unit of a healthcare facility that that particular patient support apparatus is assigned to. Thus, healthcare facility identifier may specify, for example, that patient support apparatus 20 is assigned to an emergency department, a radiology department, a maternity department, a particular floor of a multi-story healthcare facility, a particular building of a multi-building healthcare complex, and/or any other unit or entity of the healthcare facility's choosing. As will be discussed in greater detail below, healthcare facility identifier 78 is customizable by the owner of patient support apparatus 20 and may be used to keep track of where (e.g. what department) that particular patient support apparatus 20 is assigned, thereby facilitating the internal management of the patient support apparatuses 20 within a healthcare facility.

Also, in some embodiments, memory 62 may also store a unique identifier of patient support apparatus 20, such as a serial number 80. Serial number 80 is assigned by the manufacturer of patient support apparatus 20 and is not changed at any point during the life of patient support apparatus 20. Serial number 80 is therefore different from healthcare facility identifier 78, which is chosen by the administrator of the healthcare facility in which patient support apparatus 20 is positioned, and this can be changed (either to be simply re-named, or if the patient support apparatus 20 gets moved to a different department or location within the healthcare facility).

Memory 62 may also include, in some embodiments, a batch of data 82 that is generated from one or more of the sensors 76 and/or controller 60 during the operation of patient support apparatus 20. Controller 60 stores this batch of data 82 in memory 62 and, as will be discussed in greater detail below, encodes the batch of data into one or more visual codes (e.g. QR codes) that are displayed on display 52, thereby allowing a mobile computing device equipped with a camera and the appropriate data collection software application to collect this information from patient support apparatus 20.

Lift actuators 64 (FIG. 3) are components of lifts 26 and are configured to raise and lower litter frame 28 with respect to base 22. A first one of lift actuators 64 powers a first one of the lifts 26 positioned adjacent head end 38 of patient support apparatus 20 and a second one of lift actuators 64 powers a second one of the lifts 26 positioned adjacent foot end 40 of patient support apparatus 20. Lift actuators 64 may be conventional linear actuators having electric motors therein that, when driven, expand or contract the length of the linear actuator, thereby moving the litter frame 28 upward or downward and changing its height relative to the floor.

Each lift actuator 64 includes a corresponding lift sensor that detects a position and/or angle of its associated actuator 64 and feeds the sensed position/angle to controller 60. In some embodiments, controller 60 uses the outputs from these sensors as inputs into a closed-loop feedback system for controlling the motion of the actuators 64 and the litter deck. Controller 60 may also use the outputs from these sensors as a litter height sensor 76*f* and a litter tilt angle sensor 76*g*. That is, controller 60 concludes that the litter angle is zero (horizontal or parallel to the floor) if the outputs from each of these sensors is the same, or nearly identical. If they are not the same or nearly identical, controller 60 is configured to calculate the litter angle based on the magnitude of the difference between these two sensors. Still further, controller 60 is configured to calculate the litter height from the outputs of these two sensors. In some embodiments, actuators 64 are constructed in any of the same manners as the actuators 34 disclosed in commonly assigned U.S. patent application Ser. No. 15/449,277 filed Mar. 3, 2017, by inventors Anish Paul et al. and entitled PATIENT SUPPORT APPARATUS WITH ACTUATOR FEEDBACK, the complete disclosure of which is incorporated herein by reference. In such embodiments, the internal sensors may be constructed to include any of the encoders and/or switch sensors disclosed in the aforementioned '277 application.

Fowler actuator 68 and gatch actuator 66 may be constructed in the same manner as lift actuators 64, or they may be constructed in different manners. Fowler actuator 68 is adapted to pivot Fowler section 44 upward or downward when it is driven. Gatch actuator 66 is adapted to pivot the joint between thigh section 46 and foot section 48 of support deck 30 upward or downward when it is driven, thereby raising or lowering the patient's knees.

Controller 60 communicates with network transceiver 72 (FIG. 3) which, in at least one embodiment, is a Wi-Fi radio communication module configured to wirelessly communicate with one or more wireless access points 88 of local area network 90. In such embodiments, network transceiver 72 may operate in accordance with any of the various IEEE 802.11 standards (e.g. 802.11b, 802.11n, 802.11g, 802.11ac, 802.11ah, etc.). In other embodiments, network transceiver 72 may include, either additionally or in lieu of the Wi-Fi radio and communication module, a wired port for connecting a network wire to patient support apparatus 20. In some such embodiments, the wired port accepts a category 5*e* cable (Cat-5e), a category 6 or 6*a* (Cat-6 or Cat-6a), a category 7 (Cat-7) cable, or some similar network cable, and transceiver 72 is an Ethernet transceiver. In still other embodiments, network transceiver 72 may be constructed to include the functionality of the communication modules 56 disclosed in commonly assigned U.S. patent application Ser.

No. 15/831,466 filed Dec. 5, 2017, by inventor Michael Hayes et al. and entitled NETWORK COMMUNICATION FOR PATIENT SUPPORT APPARATUSES, the complete disclosure of which is incorporated herein by reference.

Regardless of the specific structure included with network transceiver 72, controller 60 is able to communicate with the local area network 90 (FIG. 3) of a healthcare facility in which the patient support apparatus 20 is positioned. When network transceiver 72 is a wireless transceiver, it communicates with local area network 90 via one or more wireless access points 88. When network transceiver 72 is a wired transceiver, it communicates directly via a cable coupled between patient support apparatus 20 and a network outlet positioned within the room of the healthcare facility in which patient support apparatus 20 is positioned.

Local area network 90 typically includes a plurality of servers 92, the contents of which will vary from healthcare facility to healthcare facility. In general, however, most healthcare facilities will include, at a minimum, an electronic medical records (EMR) server, and Admission, Discharge and Transfer (ADT) server, and a caregiver scheduling server. Such servers 92 may be conventional servers. In addition to these servers, local area network 90 may also include a patient support apparatus server 94 that carries out bidirectional communication between itself and a plurality of patient support apparatuses 20 positioned within the healthcare facility. Patient support apparatus server 94 may also communicate with any one or more of the other servers 92 on network 90 as well as, in some instance, one or more servers that are positioned outside of the healthcare facility (when network 90 is communicatively coupled to the Internet and allows such external communication).

In some embodiments, local area network 90 may include any and/or all of the servers described and disclosed in commonly assigned PCT patent application serial number PCT/US2020/039587 filed Jun. 25, 2020, by inventors Thomas Durlach et al. and entitled CAREGIVER ASSISTANCE SYSTEM, the complete disclosure of which is incorporated herein by reference. Further, in in such embodiments, patient support apparatus 20 may be configured to communicate with the servers on LAN 90 in any of the manners disclosed in the '587 PCT application, and/or to retrieve and/or share any of the information disclosed in the '587 PCT application.

Timer 70 (FIG. 3) communicates with controller 60. Timer 70 not only measures the passage of time, but it also keeps track of the calendar day (and year). As will be discussed in greater detail below, controller 60 may use the outputs from clock/calendar 70 when it gathers certain data from sensors 76. In other words, controller 60 may utilize timer 70 to timestamp one or more readings from one or more of the sensors 76, including, but not limited to, readings that are included within batch of data 82. Timer 70 may be any conventional timing device that is able to keep track of the passage of time, including the calendar day and year.

As was noted, controller 60 receives information from a plurality of sensors 76 positioned onboard patient support apparatus 20. Each of these sensors may be implemented in known and conventional manners, and each will now be described in greater detail.

A/C power sensor 76a is adapted to detect whether patient support apparatus 20 is currently plugged into an electrical outlet and receiving power from the electrical outlet (as opposed to operating on battery power).

Battery charge sensor 76b is adapted to detect a current charge level of any batteries that are positioned onboard patient support apparatus 20. In some embodiments, patient support apparatus 20 includes multiple batteries, and in such embodiments, patient support apparatus 20 includes multiple battery charge sensors 76b that detect the current charge level of each battery. In other embodiments, patient support apparatus 20 may not include any batteries, in which case battery charge sensor 76b is omitted.

Siderail sensors 76c (FIG. 3) are adapted to determine what position each siderail 36 currently is in (raised, lowered, or, in some embodiments, one or more intermediate positions between the raised and lowered positions).

Deck angle sensors 76d are adapted to determine the angular position of each section of deck 30 that is able to be pivoted. Deck angle sensors 76d therefore include a Fowler angle sensor that measures the current angular orientation of head section 44 (also known as a Head of Bed (HOB) angle) and a thigh and/or foot section sensor that measures the current angular orientation of thigh section 46 and/or foot section 48. In some embodiments of patient support apparatus 20 that include a pivotable seat section, a corresponding deck angle sensor 76d may be included that measures a current angular orientation of the seat section (with respect to a known reference, such as, but not limited to, for example, a horizontal or vertical reference).

Brake sensor 76e is adapted to determine whether a brake has been applied to one or more of the wheels 24 of patient support apparatus 20. In some embodiments, the brake is a mechanical brake that is movable between a braked position and an unbraked position, and brake sensor 76e is adapted to detect which position the brake currently is in. In other embodiments, the brake may be implemented in an electrical or other manner, and the brake sensor 76e may be implemented in one or more different manners.

Litter height sensor 76f and litter tilt angle sensor 76g were previously discussed and the former measures the height of litter frame 28 and the latter measures the tilt of litter frame 28 (e.g. with respect to horizontal or a component of patient support apparatus 20 that is typically horizontal). Sensors 76f and 76g may directly measure one or both of these quantities or they may be implemented, as discussed above, as sensors that detect the current position of lifts 26, thereby enabling controller 60 to determine the current height and tilt of litter frame 28. Still other manners of implementing these sensors 76f and/or 76g may be used.

Scale/exit detection system 74 is configured to determine a weight of a patient positioned on support deck 30 and determine when the patient is moving and is likely to exit patient support apparatus 20. Scale/exit detection system 74 includes a plurality of force sensors 76h, such as, but not limited to, load cells that are arranged to detect the weight exerted on litter frame 28. By summing the outputs from each of the force sensors 76h, the total weight of the patient is determined (after subtracting the tare weight). Further, by using the known position of each of the force sensors 76h, controller 60 determines a center of gravity of the patient and monitors the center of gravity for movement beyond one or more thresholds. One method of computing the patient's center of gravity from the output of such force sensors is described in more detail in commonly assigned U.S. Pat. No. 5,276,432 issued to Travis and entitled PATIENT EXIT DETECTION MECHANISM FOR HOSPITAL BED, the complete disclosure of which is incorporated herein by reference. Other methods for determining a patient's weight and/or the weight of non-patient objects supported on litter frame 28 are disclosed in commonly assigned U.S. patent application Ser. No. 14/776,842, filed Sep. 15, 2015, by inventors Michael Hayes et al. and entitled PATIENT SUPPORT APPARATUS WITH PATIENT INFORMATION SENSORS, and commonly assigned U.S. patent application Ser. No. 14/873,734 filed Oct. 2, 2015, by inventors Marko Kostic et al. and entitled PATIENT SUPPORT APPARA- In addition to the aforementioned sensors, patient support apparatus 20 may further be adapted to sense any of the characteristics described in the patent applications identified in the chart below, as well as to include any of the sensors disclosed in these patent applications:

| Patent/App. | Filing Date | Title | Characteristic Detected |
|---|---|---|---|
| 5,276,432 | Jan. 15, 1992 | Patient Exit Detection Mechanism for Hospital Bed | Patient's location (center of gravity) |
| 7,699,784 | Jul. 5, 2007 | System for Detecting and Monitoring Vital Signs | Patient's heart rate, breathing rate, and other vital signs |
| 9,320,444 | Mar. 14, 2014 | Patient Support Apparatus with Patient Information Sensors | Patient sleep quantity, quality, and other sleep parameters; patient weight |
| 61/449,182 | Mar. 4, 2011 | Sensing System for Patient Supports | Patient interface pressures, vital signs, |
| 14/692,871 | Apr. 22, 2015 | Person Support Apparatus with Position Monitoring | Patient movement |
| 14/873,734 | Oct. 2, 2015 | Person Support Apparatus with Motion Monitoring | Patient and object weights, movement, and position |
| 14/928,513 | Oct. 30, 2015 | Person Support Apparatus with Patient Mobility Monitoring | A patient's activity, time out of bed, number of steps, and other activity data |
| 14/578,630 | Dec. 22, 2014 | Video Monitoring System | Patient turns, bed sore assessment scores, eating and sleeping, exit detection system status, etc. |
| 15/346,779 | Nov. 9, 2016 | Person Support Apparatus with Acceleration Detection | Patient vital signs, position, movement |
| 15/809,351 | Nov. 10, 2017 | Patient Support Apparatuses with Mobility Assessment | Patient mobility score and/or assessments |
| 15/709,586 | Sep. 20, 2017 | Systems and Methods for Determining the Usability of Person Support Apparatuses | Cleanliness and/or usability status of a patient support apparatus |

TUSES WITH MOTION MONITORING, the complete disclosures of both of which are incorporated herein by reference. Other systems for determining a patient's weight and/or detecting a patient's exit from patient support apparatus 20 may alternatively be used.

Further, it will be understood that the scale and exit detection functions of scale/exit detection system 74 may be separated and independent, rather than combined in the manner shown in FIG. 3. Thus, for example, in some embodiments, an exit detection system might be implemented using a pressure sensing mat, cameras, or some other sensor(s) that are separate from the force sensors 76h used to detect the patient's weight.

It will also be understood that the set of sensors 76a-h shown in FIG. 3 may be varied in different embodiments of patient support apparatus 20. That is, in some embodiments of patient support apparatus 20, one or more of sensors 76a-h may be omitted, one or more additional sensors may be added, and/or a combination of omitted and additional sensors may be included. Still further, in some embodiments, one or more meta-sensors may be included that detect one or more conditions of one or more sensors 76a-h themselves. Examples of suites of meta-sensors that are used to detect the condition of one or more other sensors onboard a patient support apparatus are disclosed in commonly assigned U.S. patent application Ser. No. 16/367,872 filed Mar. 28, 2019 by inventors Marko Kostic et al. and entitled PATIENT SUPPORT APPARATUSES WITH MULTI-SENSOR FUSION, the complete disclosure of which is incorporated herein by reference. Any of the embodiments of patient support apparatus 20 disclosed herein may include one of more of the meta-sensors disclosed in the aforementioned '872 application, and/or one or more other types of meta-sensors.

Each of these commonly assigned patent applications is incorporated herein by reference in its entirety.

Patient support apparatus 20 may also include one or more patient presence/movement detectors that are adapted to automatically detect whether or not a patient is currently present on patient support apparatus 20, as well as, in some instances, to detect movement and/or the position of the patient when the patient is supported on patient support apparatus 20. The specific components of patient the presence detector and/or manner in which it detects a patient's presence/absence/movement/location may vary from embodiment to embodiment. In one embodiment, the patient presence detector uses force sensors 76h. In another embodiment, the patient presence detector may alternatively be implemented using one or more thermal sensors mounted to patient support apparatus 20 that detect the absence/presence of the patient and/or the position of the patient's head on patient support apparatus 20. Further details of such a thermal sensing system are disclosed in commonly assigned U.S. patent application Ser. No. 14/692,871 filed Apr. 22, 2015, by inventors Marko Kostic et al. and entitled PERSON SUPPORT APPARATUS WITH POSITION MONITORING, the complete disclosure of which is incorporated herein by reference. In still other embodiments, the patient presence detector detects the absence/presence/movement/location of a patient using one or more of the methods disclosed in commonly assigned U.S. patent application Ser. No. 14/928,513 filed Oct. 30, 2015, by inventors Richard Derenne et al. and entitled PERSON SUPPORT APPARATUSES WITH PATIENT MOBILITY MONITORING, the complete disclosure of which is also hereby incorporated herein by reference. In yet other embodiments, the patient presence detector includes one or more video cameras for detecting the patient's presence, absence, movement, and/or position, such as disclosed in commonly assigned U.S.

patent application Ser. No. 14/578,630 filed Dec. 22, 2014, by inventors Richard Derenne et al. and entitled VIDEO MONITORING SYSTEM, the complete disclosure of which is also hereby incorporated herein by reference. In yet another alternative embodiment, the presence, absence, movement and/or position of a patient is detected using a pressure sensing mat. The pressure sensing mat is positioned on top of the mattress or support deck 30, such as is disclosed in commonly assigned U.S. patent application Ser. No. 14/003,157 filed Mar. 2, 2012, by inventors Joshua Mix et al. and entitled SENSING SYSTEM FOR PATIENT SUPPORTS, the complete disclosure of which is also incorporated herein by reference. In still other embodiments, the patient presence detector may take on still other forms.

As was noted previously, controller 60 is configured, in at least some embodiments, to time stamp one or more of the readings from any one or more of the aforementioned sensors. Further, as will be discussed in greater detail below, controller 60 may be configured to add the readings from any one or more of these sensors (with or without the time stamps) to batch of data 82. Thus, for example, in those embodiments that include scale 74, controller 60 may be configured to not only record weight readings from force sensors 76h of the patient supported on patient support apparatus 20, but to also maintain a history of these weight readings, as well as to include one or more of these weight readings in batch of data 82. As another example, in those embodiments of patient support apparatus 20 that are equipped with a patient presence sensor, controller 60 may be configured to record in memory 62 (in batch of data 82) the amount of time that patient support apparatus 20 is occupied by a patient, and/or the amount of time the patient support apparatus 20 is not occupied by a patient. Still other information may be recorded in batch of data 82, as will be discussed in more detail below.

In some embodiments, although not shown in FIG. 3, patient support apparatus 20 includes a nurse call communication interface that allows patient support apparatus 20 to communicate with a conventional nurse call outlet that is typically positioned on the headwall of most hospital rooms. Such communication between patient support apparatus 20 and the nurse call outlet may take place via a conventional nurse call cable, or it may take place wirelessly. When constructed to implement this communication wirelessly, patient support apparatus 20 may use the wireless communication structures, techniques, functions, and/or algorithms disclosed in any of the following commonly assigned patent references: U.S. Pat. No. 9,999,375 issued Jun. 19, 2018, to inventors Michael Hayes et al. and entitled LOCATION DETECTION SYSTEMS AND METHODS; U.S. patent application Ser. No. 16/215,911 filed Dec. 11, 2018, by inventors Alexander Bodurka et al. and entitled HOSPITAL HEADWALL COMMUNCIATION SYSTEM; U.S. patent application Ser. No. 16/193,150 filed Nov. 16, 2018, by inventors Alexander Bodurka et al. and entitled PATIENT SUPPORT APPARATUSES WITH LOCATION/MOVEMENT DETECTION; U.S. patent application Ser. No. 16/217,203 filed Dec. 12, 2018, by inventor Alexander Bodurka et al. and entitled SMART HOSPITAL HEADWALL SYSTEM; U.S. patent application Ser. No. 14/819, 844 filed Aug. 6, 2015, by inventors Krishna Bhimavarapu et al. and entitled PATIENT SUPPORT APPARATUSES WITH WIRELESS HEADWALL COMMUNICATION; U.S. patent application Ser. No. 63/26,937 filed May 19, 2020, by inventors Alexander Bodurka et al. and entitled PATIENT SUPPORT APPARATUSES WITH HEADWALL COMMUNICATION; U.S.

patent application Ser. No. 63/131,508 filed Dec. 29, 2020, by inventors Kirby Neihouser et al. and entitled TOOL FOR CONFIGURING HEADWALL UNITS USED FOR PATIENT SUPPORT APPARATUS COMMUNICATION; and/or U.S. patent application Ser. No. 63/161,175 filed Mar. 15, 2021, by inventors Krishna Bhimavarapu et al. and entitled EXERCISE DEVICE AND PATIENT SUPPORT APPARATUS, the complete disclosures of all of which are incorporated herein by reference.

In some embodiments, patient support apparatus 20 and/ or patient support apparatus server 84 may also include any or all of the functionality of the patient support apparatuses and/or patient support apparatus servers described in any of the aforementioned commonly assigned U.S. patents and/or patent applications.

Figure 4:
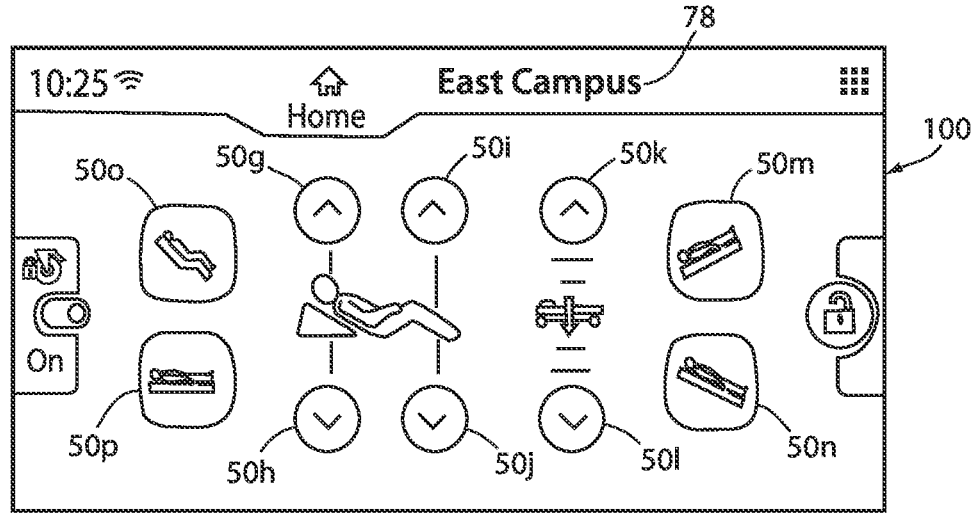
FIG. 4 is an example of a home screen that may be displayed on one or more displays of the patient support apparatus of FIG. 1 (or FIG. 6)
Figure 5:
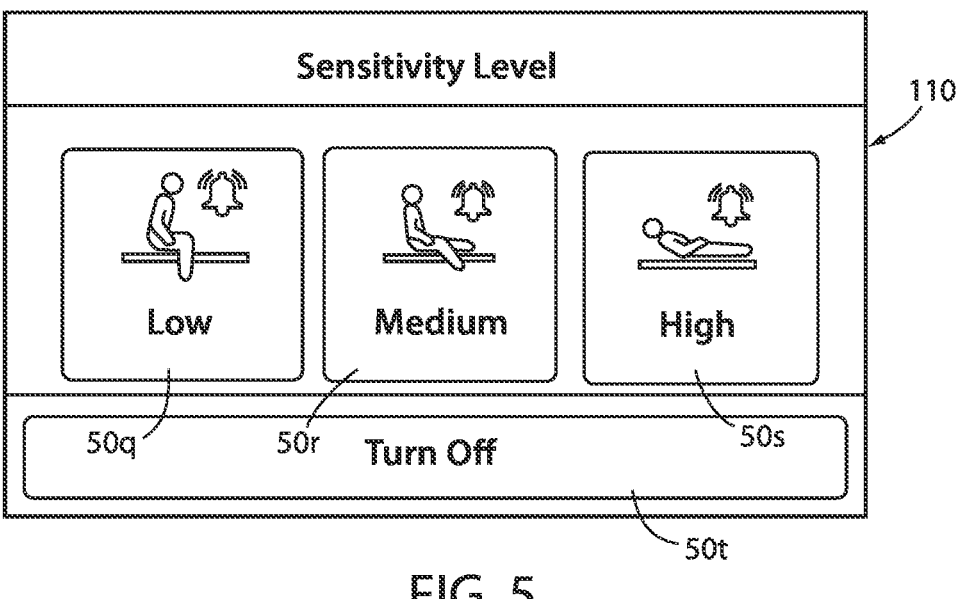
FIG. 5 is an example of a non-home screen that may be displayed on one or more displays of the patient support apparatus.

Turning to FIG. 4, controller 60 is configured to display at least one home screen, such as the home screen 100 shown therein. In some embodiments, controller 60 automatically displays the home screen 100 when patient support apparatus 20 is initially powered on and/or after a certain amount of time displaying a non-home screen on display 52 without any user interaction. That is, controller 60 is programmed to display other non-home screens (e.g. non-home screen 110 of FIG. 5) on display 52, but it is further programmed to automatically return to displaying home screen 100 after a defined amount of time passes without any user activity while displaying the non-home screen and/or without any changing content of the non-home screen. Thus, for example, if the user presses on navigation control 50a, controller 60 is programmed to display a non-home screen that relates to controlling exit detection system 74, such as non-home screen 110 (FIG. 5). While displaying non-home screen 110, the user has the option of pressing on one or more controls 50 shown on non-home screen 110. If a defined amount of time passes without the user pressing on these controls, or if a defined amount of time passes after the user has pressed on one or more of these controls, controller 60 is programmed to automatically return to displaying home screen 100. The defined amount of time may vary greatly, but in general may be on the order of about a half a minute to two minutes (although other times outside of this range may be also be used). Thus, after a defined amount of time passes without any user activity related to a non-home screen, controller 60 automatically returns to displaying home screen 100.

Figure 2:
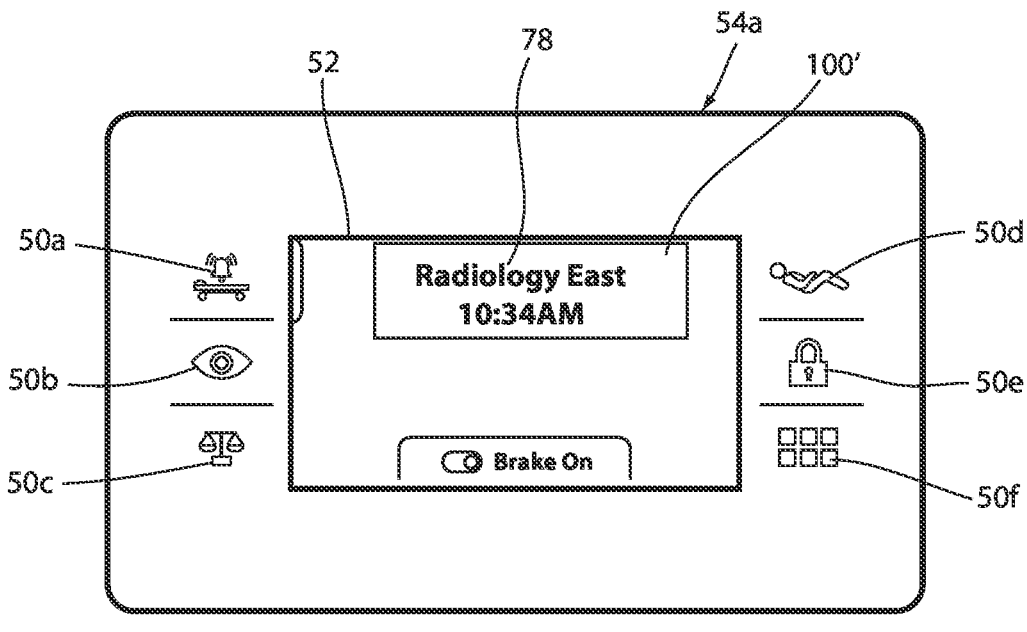
FIG. 2 is a plan view of an illustrative caregiver control panel of the patient support apparatus.

It will be understood that the home screen 100 shown in FIG. 4 is only one example of the type of screen that may serve as a home screen for patient support apparatus 20. For example, FIG. 2 illustrates an alternative home screen 100' that may be displayed on display 52 by controller 60 in some embodiments as the home screen. Still other types of screens may be used by controller 60 as a home screen.

In the particular example shown in FIG. 4, home screen 100 is a motion control screen that is used to control the movement of various components of patient support apparatus 20. Motion control screen 100 includes a plurality of motion controls 50 for controlling the movement of patient support apparatus 20. Specifically, it includes Fowler lift and lower controls 50g and 50h, gatch lift and lower controls 50i and 50j, litter frame lift and lower controls 50k and 50l, a chair position control 500, a flat position control 50p, a Trendelenburg control 50m, and a reverse Trendelenburg control 50n.

Pressing on either of Fowler controls 50g, 50h results in controller 60 sending one or more signals to Fowler actuator 68 instructing it to raise or lower head section 44, depending upon whether raise control 50g is pressed or lower control 50*h* is pressed. Pressing on either of gatch controls 50*i*, 50*j* causes controller 60 to send one or more signals to gatch actuator 66 instructing it to raise or lower the gatch of patient support apparatus 20, depending upon whether raise control 50*i* is pressed or lower control 50*j* is pressed. Pressing on either of lift controls 50*k*, 50*l* causes controller 60 to send one or more signals to lift actuators 64 instructing them to raise or lower litter frame 28, depending upon whether raise control 50*k* is pressed or lower control 50*l* is pressed. Pressing on Trendelenburg position control 50*m* or reverse Trendelenburg position 50*n* causes controller 60 to send one or more signals to lift actuators 64, gatch actuator 66, and/or Fowler actuator 68 instructing them to move litter frame 28 and support deck 30 to the Trendelenburg or reverse Trendelenburg position, respectively. Pressing on chair control 50*o* causes controller 60 to send one or more signals to one or more of actuators 64, 66, and/or 68 in order to cause litter frame 28 and support deck 30 to move to a chair-like position. Pressing on flat control 50*p* causes controller 60 to send one or more signals to gatch actuator 66 and/or Fowler actuator 68 cause them to move support deck 30 to a generally flat orientation.

Home screen 100 (FIG. 4) also includes a display of the healthcare facility identifier 78 which, in this example, states "East Campus." This identifier 78 is chosen by the healthcare facility in order to keep track of which patient support apparatuses 20 belong to which units of the overall healthcare facility. "East Campus" therefore might be used in a healthcare facility having multiple campuses that are referred to by healthcare personnel by their geographic orientation (e.g. east campus, west campus, north campus, etc.). It will, of course, be understood that healthcare facility identifier 78 may take on whatever form is desired by the administrator of the particular healthcare facility that owns the patient support apparatus. Thus, as some other non-limited examples, healthcare facility identifier 78 might identify the name of the healthcare facility itself (e.g. Cedars Sinai, Mayo Clinic, Cleveland Clinic, etc.). Alternatively, or additionally, healthcare facility identifier 78 might include a particular department, ward, or other type of unit of the healthcare facility (e.g. post-op, radiology, intensive care, emergency department, pediatrics, maternity, etc.). Still further, healthcare facility identifier 78 might include, either additionally or alternatively, other location information, such as a particular floor of a multi-story building, a particular sub-unit of a department, a particular function of the patient support apparatus 20 (e.g. transport, triage, etc.), and/or other information. In general, healthcare facility identifier may include any information that is helpful in ensuring that the patient support apparatus is returned to the correct area, department, or other location of the healthcare facility if it is moved out of that assigned location. This helps ensure that the healthcare facility's patient support apparatuses 20 tend to stay within their assigned locations within the facility, thereby avoiding shortages or gluts of patient support apparatuses in certain areas, as well as helping to ensure that the patient support apparatuses 20 having specialized functionality remain in the areas of the healthcare facility where that specialized functionality is desired.

Identifier 78, whether shown on home screen 100 or an alternative type of home screen (e.g. home screen 100'), may be positioned anywhere on the home screen that is easily seen by the user. In some embodiments, identifier 78 remains on the home screen at all times, no matter what other controls 50 on the home screen the user may activate (other than controls 50 that take the user to a non-home screen). Thus, for example, in the example shown in FIG. 4, identifier 78 remains on home screen 100 even when the user presses on one or more of the motion controls 50*g-p*.

In some embodiments, controller 60 may be configured to automatically scale the side of identifier 78 so that it fits within any size restrictions of display 52, while still allowing the user to view data/controls positioned elsewhere on display 52. That is, in some embodiments, controller 60 is configured to automatically change the size of identifier 78 so that sufficient room remains on the other areas of display 52 (that are not displaying identifier 78) for displaying information appropriate for carrying out the functions of patient support apparatus 20. In some of these embodiments, controller 60 may resize identifier 78 during the operation of patient support apparatus 20, depending upon what other content it is displaying on display 52. In other of these embodiments, controller 60 may display identifier 78 with a static size that is selected to allow sufficient room for other information to be displayed on display 52.

The purpose of identifier 78 being prominently displayed somewhere on home screen 100 is to remind the user to which department, wing, floor, or other unit the patient support apparatus 20 is assigned. In this manner, if the patient support apparatus 20 is moved out of its assigned department, wing, floor, or other unit, it is more likely that a user will notice that the patient support apparatus 20 has been moved outside of its assign location, and therefore more likely that he or she will return the patient support apparatus 20 to its assigned location. This helps reduce the tendency of patient support apparatuses 20 remaining outside of their assigned locations, which in turn helps reduce the possibility of shortages existing in one or more locations, including shortages of specific types of patient support apparatuses (e.g. ones with specific features).

In at least one embodiment, identifier 78 is not able to be changed at all via any of the control panels 54 on patient support apparatus 20, but instead can only be changed remotely via patient support apparatus server 94 sending a message to the patient support apparatus 20. Alternatively, in some embodiments, identifier 78 can be changed locally at patient support apparatus 20 via one or more control panels 54, but the manner in which it can be changed is concealed from everyday users of patient support apparatus 20. For example, in at least some of these latter embodiments, identifier 78 is only able to be changed locally via a control panel 54 if the user presses on a certain combination of controls 50 (or one or more controls for an extended period of time). In such embodiments, the patient support apparatus 20 does not include any instructions or indicia explaining, or otherwise indicating, to the user what this combination is.

For example, in some embodiments, if the user presses, say, controls 50*b* and 50*e* simultaneously for a predefined amount of time (e.g. a second or more), controller 60 is configured to bring up a screen that enables the user to change the content of identifier 78. In some embodiments, this screen includes an alphanumeric keyboard, such as shown and discussed in greater detail below with respect to FIG. 9. In other embodiments, particularly where the size of display 52 may not be large enough to include a full alphanumeric keyboard, or where display 52 is not a touch screen, the screen for changing identifier 78 may include one or more arrow keys, or the like, for scrolling through the alphabet and selecting which letters (or numbers) to include in identifier 78. In addition to the arrow keys, the screen also includes controls for entering the selected letters (or number), as well as deleting existing letters (or numbers). In some embodiments, the controls for entering the new identifier 78, and/or deleting the old identifier 78, are controls 50 that serve other functions when different screens are displayed on display 52. Thus, for example, in some embodiments, any of controls 50a-50f might be utilized for entering and/or deleting identifier 78 information when the specific screen is displayed on display 52 that enables such changes, but when that screen is not displayed, controls 50a-50f go back to functioning in the manner previously described.

The combination of controls 50 that must be activated in order to bring up one or more screens on display 52 that allow identifier 78 to be changed can take on a wide variety of different forms. In addition to, or as an alternative to, pressing two or more controls 50 simultaneously, the combination may involve one or more sequences of controls 50, as well as pressing and holding one or more controls 50 for predefined amounts of time. Whatever the particular combination of controls 50 that are to be activated in order to change identifier 78, controller 60 is programmed to monitor the activation of controls 50 and look for that particular combination and, if detected, display one or more screens, such as the one shown in FIG. 9, to allow the user to change identifier 78.

In yet another alternative embodiment, controller 60 may be configured to display a control on display 52 (on a particular screen, such as a settings screen, or the like) that is used to change identifier 78, but after the user activates the control, controller 60 is configured to ask for a password or other type of authorization code before allowing the user to change identifier 78. In this manner, only individuals who know the password or authorization code are able to change identifier 78 using control panel 54a of patient support apparatus 20.

It can therefore be seen from the foregoing discussion that by reducing the ability, and/or ease, of everyday users of patient support apparatus 20 to change identifier 78, identifier 78 will remain in the form desired by the healthcare facility administrators. Users of patient support apparatus 20 will therefore not be able to override the assignments reflected by identifier 78 without seeking approval of one or more administrators of the healthcare facility. This help ensure that the administrators' plans for where to assign patient support apparatuses 20 within a particular healthcare facility are not changed without their permission.

In some embodiments of patient support apparatus 20 that have more than one display 52, healthcare facility identifier 78 is shown on the home screen all of those displays 52. In other embodiments, healthcare facility identifier 78 may be shown on only one of the multiple displays 52 (or less than the entire set of multiple displays 52). Still further, in some embodiments, controller 60 may be configured to display healthcare facility identifier 78 on more than just a single home screen 100. In these embodiments, controller may be configured to display identifier 78 on all of the entire set of different screens that are able to be shown on display 52, or on any subset of this set. In still other embodiments, controller 60 may be configured to not automatically display healthcare facility identifier 78 on home screen 100, but instead only display identifier 78 in response to the user activating a specific control (wherein the specific control may only be shown on a particular screen that the user must navigate to in order to access the control). In most embodiments, however, controller 60 is configured to automatically display healthcare facility identifier 78 on home screen 100, or one or more other screens that are frequently displayed on display 52 so that the user is apprised of the department, wing, floor, or other unit to which that patient support apparatus 20 has been assigned by the healthcare facility administrators. In such embodiments, the screen on which identifier 78 is displayed is automatically displayed at various times (e.g. inactivity for more than a given amount of time, after the display awakens from a sleep state, etc.) such that the user does not have to manually navigate to any particular screen to see the identifier.

As was noted previously, FIG. 5 illustrates an example of a non-home screen 110 that controller 60 may be configured to display in some embodiments of patient support apparatus 20. In such embodiments, controller 60 is configured to display non-home screen 110 in response to a user activating control 50a (FIG. 2), which is the control used for controlling the exit detection functions of the scale/exit detection system 74. Non-home screen 110 includes three sensitivity level controls 50q, 50r, and 50s, and one arming control 50t. In response to the user selecting one of controls 50q, 50r, 50s, and then pressing arming control 50t, controller 60 arms the exit detection system onboard patient support apparatus 20 with the selected level of sensitivity. The selected level of sensitivity refers to the amount of movement the patient is able to make toward exiting the patient support apparatus 20 before triggering an exit alert. Thus, if the user selects the low sensitivity control 50q, the patient is able to freely move to the edges of the patient support apparatus 20 before an exit alert will be issued. In contrast, if the user selects the high sensitivity control 50s, the exit alarm will be triggered with very little movement of the patient from his or her initial position (i.e. the position they were in when the exit detection system was initially armed).

As was noted, controller 60 is configured in some embodiments to not display healthcare facility identifier 78 on non-home screen 110. It will be understood that non-home screen 110 is but one of numerous types of non-home screens that controller 60 may display on display 52.

Figure 6:
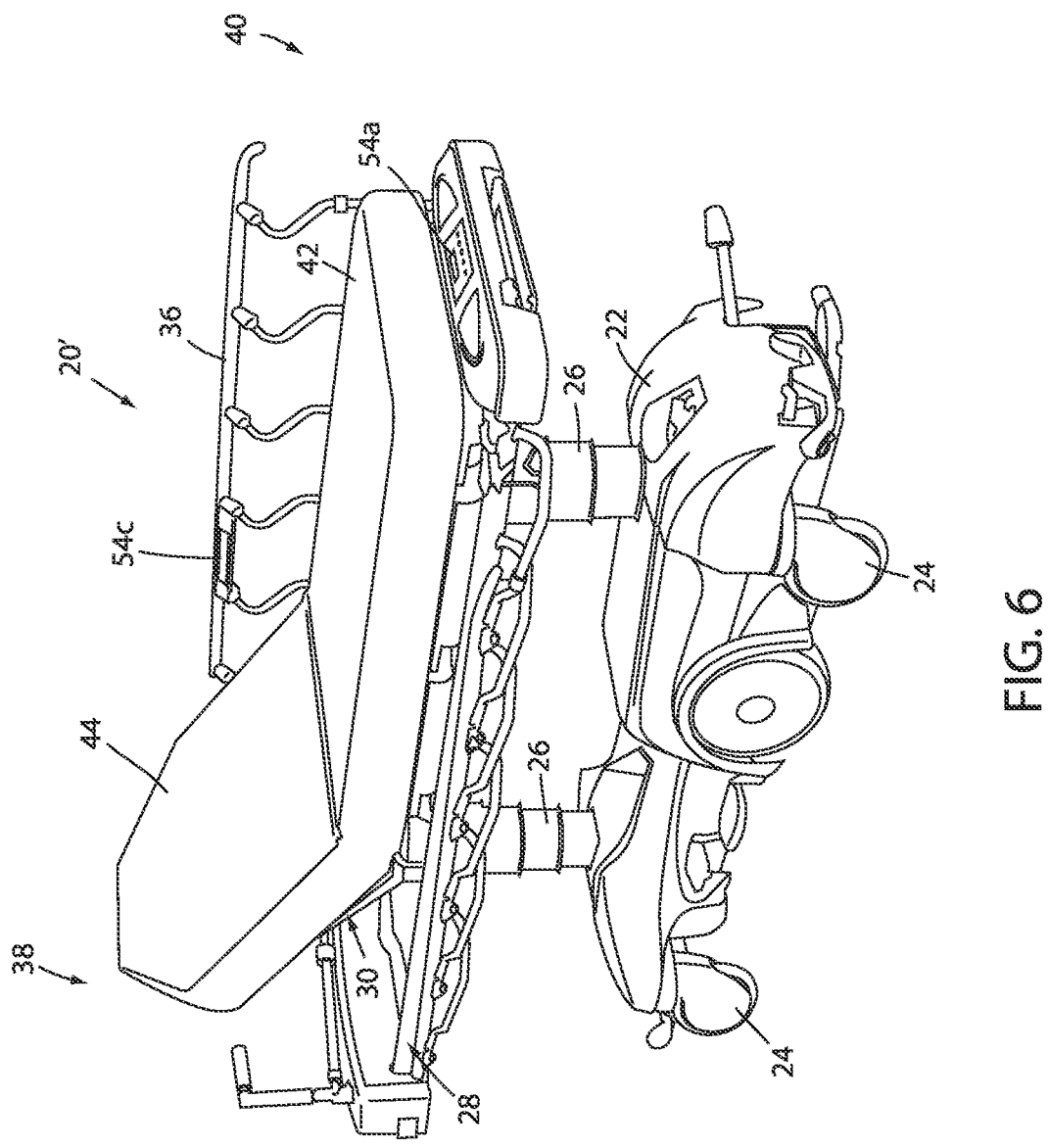
FIG. 6 is a perspective view of another patient support apparatus according to a second embodiment of the present disclosure.

FIG. 6 illustrates another example of a patient support apparatus 20' that may incorporate any one or more of the features described herein. Patient support apparatus 20' of FIG. 6 differs from patient support apparatus 20 of FIG. 1 in that patient support apparatus 20 is shown to be a bed in FIG. 1, while patient support apparatus 20' is shown as a stretcher in FIG. 6. Patient support apparatus 20' includes a number of features and components that are the same as or very similar to components of patient support apparatus 20. Those components are labeled with the same number as used with respect to patient support apparatus 20 and, unless otherwise explicitly stated herein, operate in the same manner as the like-numbered components of patient support apparatus 20. Those components that are the new or substantially different from what has been previously described with respect to patient support apparatus 20 have been labeled herein with a new number. It will also be understood that the internal components of patient support apparatus 20' may include all of the same components shown in FIG. 3, a subset of those components, one or more additional components, and/or any partial combination of these components with any other suitable components. Thus, the block diagram of FIG. 3 is equally applicable to both patient support apparatus 20 and patient support apparatus 20'.

Patient support apparatus 20' (FIG. 6) includes a foot end control panel 54a that is used to control various functions of patient support apparatus 20'. Foot end control panel 54a is shown in more detail in FIGS. 7 and 8. Foot end control panel 54a includes a bed exit system control 50a and a scale control 50c that operate in a similar manner to the bed exit system control 50a and scale control 50c of patient support apparatus 20, respectively. In addition to these two controls, control panel 54a includes a weight unit control 50u that, when pressed, toggles between displaying a measured weight in pounds and kilograms. Control panel 54a also includes a zero control 50v that, when pressed, zeros the scale system. Still further, control panel 54a includes a plurality of indicators 98 that indicate the status of various aspects of patient support apparatus 20.

Figures 7, 8:
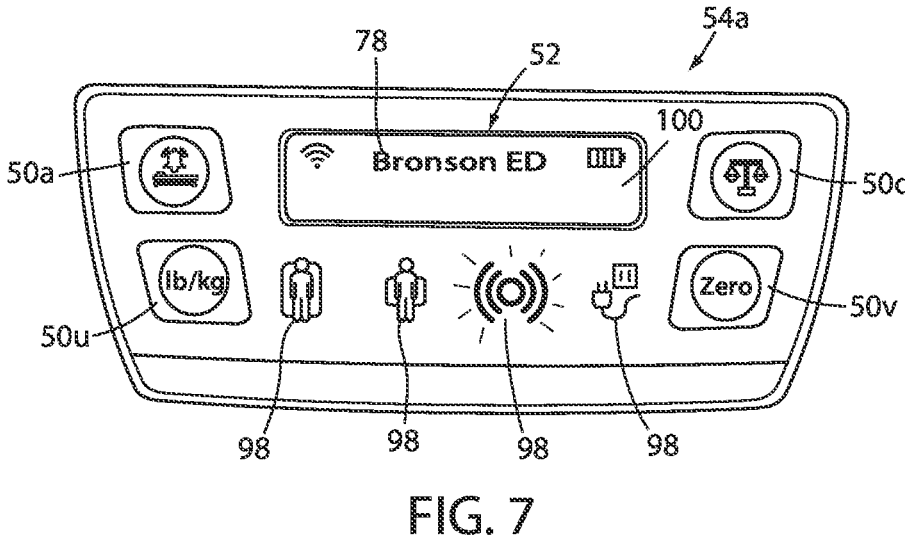
FIG. 7 is a plan view of a control panel of the patient support apparatus of FIG. 6 showing an example of a home screen.
FIG. 8 is a plan view of the control panel of FIG. 7 showing an example of a non-home screen.

FIG. 7 illustrates one example of a home screen 100 that may be displayed on display 52 of foot end control panel 54a. FIG. 8 illustrates one example of a non-home screen 110 that may be displayed on display 52 of control panel 54a (such as in response to activating scale control 50c). As can be seen in FIG. 7, home screen 100 includes a healthcare facility identifier 78, while non-home screen 110 (FIG. 8) does not include such a healthcare facility identifier 78. FIGS. 6-8 therefore illustrate another example of a patient support apparatus 20' that may automatically display a healthcare facility identifier 78 on a home screen 100 in any of the same manners discussed above with respect to patient support apparatus 20.

Although home screen 100 may vary considerably from what is shown in the accompanying drawings, home screen 100 of FIG. 7 includes a battery charge indicators and a WiFi or network connectivity indicator. The battery charge indicator provides an indication of the charge level of one or more batteries onboard patient support apparatus 20. The WiFi or network connectivity indicator provides in an indication that patient support apparatus 20' is currently connected to the healthcare facility's local area network 90. A number of other icons and/or controls may be displayed on home screen 100, such as, but not limited to, the current time and/or date, one or more status indicators that indicate the status of various features of patient support apparatus 20' (e.g. if the exit detection system is armed/disarmed, the brake is on/off, etc.), one or more controls for controlling aspects of patient support apparatus 20', etc.

Patient support apparatus 20', and its associated controller 60, may be configured in any of the same manners discussed above with respect to patient support apparatus 20, in terms of its ability to change the healthcare facility identifier, as well as with respect to any of the other functions/features discussed above. Thus, for example, patient support apparatus 20' may be configured to only allow a user to change healthcare facility identifier 78 by sending a command with the new healthcare facility identifier 78 from patient support apparatus server 94 to patient support apparatus 20'. Alternatively, patient support apparatus 20' may be configured to allow a user to change healthcare facility identifier 78 locally via control panel 54a in response to a user activating a combination of controls 50, or in any of the other manners discussed above with respect to patient support apparatus 20. In general, patient support apparatus 20' may include any of the features and/or functions discussed above with respect to patient support apparatus 20.

Figure 9:
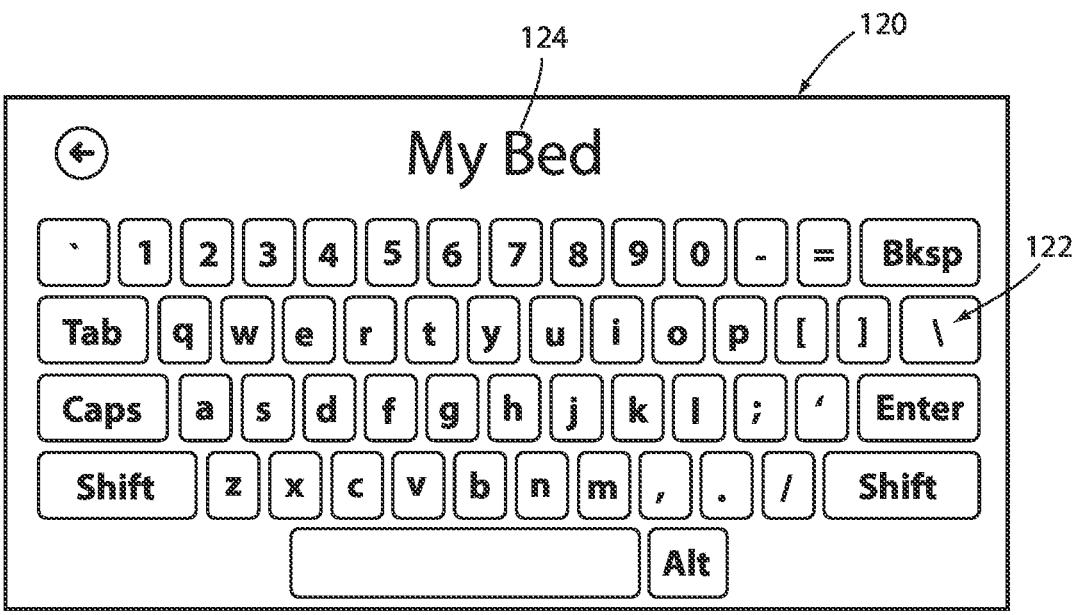
FIG. 9 is keyboard screen that may be displayed in some embodiments of either, or both, of the patient support apparatus embodiments of FIGS. 1 and/or 6.

In those embodiments of patient support apparatuses 20 and/or 20' that include the ability of a user to change healthcare facility identifier 78 locally (such as via one of the control panels 54), controller 60 may be programmed to display an identifier editing screen, such as editing screen 120 shown in FIG. 9, in response to the user activating the correct combination of controls 50 for editing healthcare facility identifier 78. Editing screen 120 includes a virtual alphanumeric keyboard 122 and an identifier field 124. By pressing on the desired characters of the alphanumeric keyboard 122, the selected characters are displayed in identifier field 124. A backspace virtual key, or the like, may be used by the user to delete undesired characters from identifier field 124. Once the desired identifier has been entered into identifier field 124, the user presses on the virtual enter key, and controller 60 responds by replacing the current healthcare facility identifier 78 (if there is one stored) with the string of characters in identifier field 124. In other words, the identifier in identifier field 124 thereafter becomes the healthcare facility identifier 78. In this manner, the user is able to edit what information is stored in identifier field 78.

Figure 10:
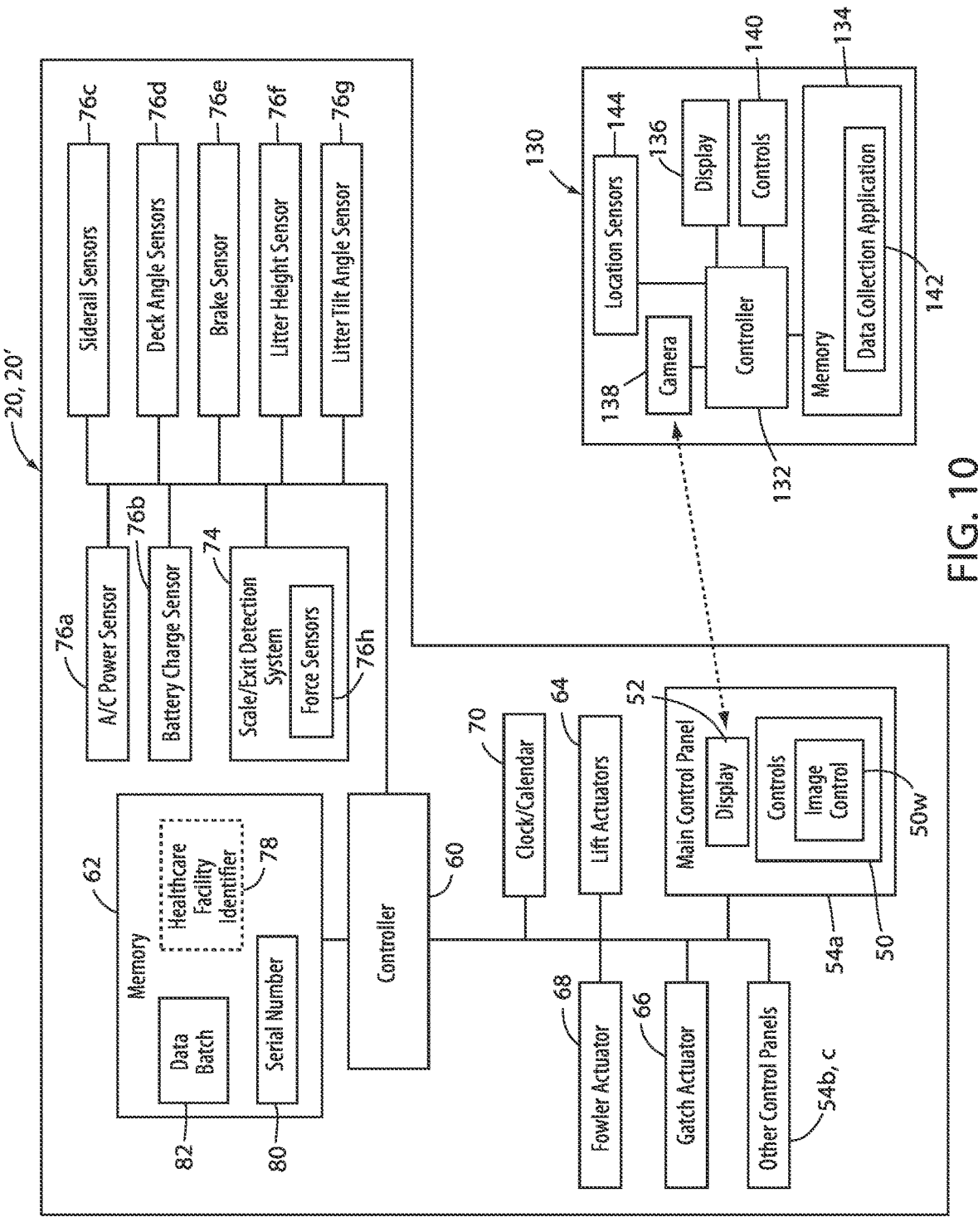
FIG. 10 is a block diagram of several of the internal components of an alternative embodiment of the patient support apparatus of FIG. 1 (or FIG. 6), as well as a data application tool that may be used to collect data from the patient support apparatus.

FIG. 10 illustrates various internal components of an alternative embodiment of patient support apparatuses 20, 20', as well as a data collection tool that may be used to collect data from patient support apparatuses 20, 20'. It will be understood that the components of patient support apparatus 20, 20' shown in FIG. 10 are merely another illustrative example of components that may be included within these patient support apparatuses, and that some embodiments of these patient support apparatuses will include fewer components than what is shown in FIG. 10, and/or that other embodiments of these patient support apparatuses will include more components than what is shown in FIG. 10.

In general, the patient support apparatuses 20, 20' of FIG. 3 all include the ability to store and display a healthcare facility identifier 78, and some of these, but not necessarily all of these, include the ability to store and export a data batch 82, as will be discussed in greater detail below. That is, the ability to store and display the healthcare facility identifier 78 is a common feature of all of the patient support apparatuses of FIG. 3, while the ability to store and export data batch 82 is an optional feature. In contrast, all of the patient support apparatuses 20, 20' of FIG. 10 include the ability to store and export data batch 82, but the ability to store and display a healthcare facility identifier 78 is an optional feature that may or may not be included within these patient support apparatuses 20, 20. In sum, the healthcare facility identifier features 78 and the data batch feature 80 discussed herein are separate and independent concepts that, in some embodiments of patient support apparatuses 20, 20' are combined, but in other embodiments are present alone within a patient support apparatus 20, 20'.

The set of components shown in FIG. 10 includes many of the same components shown in FIG. 3, and unless otherwise explicitly stated herein, these components operate in the same manner as the like-numbered components of patient support apparatus 20. Those components that are the new or substantially different from what has been previously described with respect to patient support apparatus 20 have been labeled herein with a new number. As with FIG. 3, all or some of the components of FIG. 10 may be incorporated into either or both of patient support apparatuses 20 and 20'.

As was noted above, the patient support apparatuses 20, 20' that include the components shown in FIG. 10 include a batch of data 82 (and optionally a healthcare facility identifier 78) stored in memory 62. Controller 60, in these embodiments, is configured to stored information within batch of data 82 during the operation of patient support apparatus 20, 20'. The information stored within batch of data 82 may include any data that is desirably collected from patient support apparatuses 20, 20'. Examples of this type of data include, but are not limited to, patient weight readings taken from scale system 74; other weight readings (e.g. non-patient weight) taken from scale 74; activations of the scale zeroing function; errors in the scale readings; individual forces detected by the individual force sensors 76h; the arming and/or disarming of exit detection system 74; a history of center-of-gravity readings from the force sensors 76h; activations of each of the actuators 64, 66, 68; cumulative or individual distances traveled by each of the actuators 64, 66, 68; motor information from each of the actuators 64, 66, 68 (e.g. current draw, voltage drop, etc.); diagnostic information regarding any of the components of the patient support apparatus; sensor data from any one or more of the various sensors 76a-h; software versions of one or more software modules onboard the patient support apparatus; faults from any of the electrical or electro-mechanical devices; usage statistics from any of the features, functions, or components of the patient support apparatus 20 (e.g. cumulative usage time, start and stop times, number of usages, etc.); or any other information that is desirably communicated to, and gathered by, one or more off-board computing devices. Further, any of the aforementioned data may include time stamps indicating when the reading was taken (date and/or time of day) and/or indicating when the information was gathered.

In addition to patient support apparatus 20 or 20', FIG. 10 illustrates a data collection tool 130. Data collection tool 130 is a handheld tool used to collect batch of data 82 in an optical manner, as will be discussed more below. Data collection tool 130 includes a controller 132, a memory 134, a display 136, a camera 138, one or more controls 140, and, in some embodiments, one or more location sensors 144. Memory 134 includes a data collection software application 142 that is executed by controller 132. Data collection tool 130 may be a conventional smart phone, tablet computer, laptop computer, or other type of computer that is able to execute software application 142 and that includes the components shown in FIG. 10.

Controller 132 of data collection tool 130, like controller 60 of patient support apparatuses 20, 20', may take on a variety of different forms. In the illustrated embodiment (FIG. 10), controller 132 is implemented as one or more conventional microcontrollers. However, controller 132 may be modified to use a variety of other types of circuits-either alone or in combination with one or more microcon-trollers—such as, but not limited to, any one or more microprocessors, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arrang-ing them in other manners, whether combined into a single unit or distributed across multiple units. The instructions followed by controller 132 when carrying out the functions described herein, as well as the data necessary for carrying out these functions, are stored in memory 134.

Display 136, camera 138, and controls 140 of data col-lection tool 130 (FIG. 10) may all be conventional structures found on commercially available smart phones, tablet com-puters, laptop computers, desktop computers, and/or other types of computers. Thus, display 136 may be a conven-tional LCD screen (either touch sensitive or not); camera 138 may be a conventional computer camera built into a phone, tablet, or computer; and controls 140 may comprise one or more keys, switches, and/or touch sensitive sensors that are used to control the phone, tablet, or computer. Memory 134 of data collection tool 130 includes data collection application 142 that is executed by controller 132 in order to carry out the data collection functions described herein. Memory 134 may also include additional software, firmware, and/or other data used for carrying out the func-tions described herein. Memory 134, as with memory 62, may be conventional flash memory, one or more hard drives, and/or any other type of non-volatile memory that is acces-sible by the respective controller 132, 60.

As was noted above, data collection tool 130 is used to wirelessly and optically collect data from one or more patient support apparatuses 20, 20' that collect batch of data 82. Such patient support apparatuses include an image control 50w that is activated by a user when he or she wishes to transfer the batch of data 82 to data collection tool 130. More particularly, when a user presses on, or otherwise activates, image control 50w, controller 60 reads the batch of data 82 stored in memory 62, encodes the data in a visual code, such as a bar code, a QR code, or the like, and displays the visual code on display 52. One example of a QR code that controller 60 may generate in response to a user pressing on image control 50w is show in FIG. 11.

Figure 11:
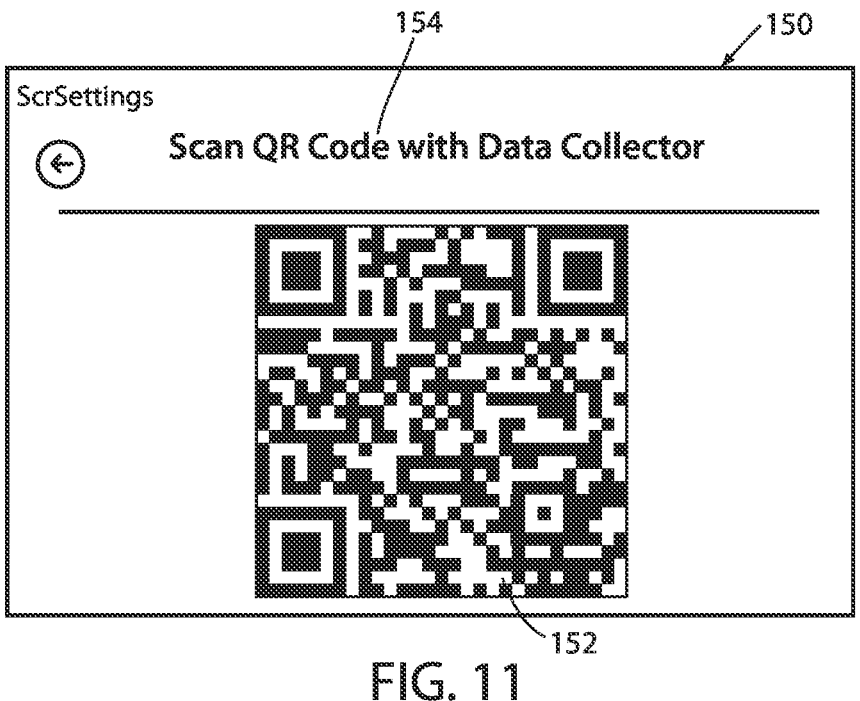
FIG. 11 is a first example of a coded image screen that may be displayed on the display of some embodiments of the patient support apparatuses of FIG. 1 or 6.

FIG. 11 illustrates a first example of a QR screen 150 that may be displayed by controller 60 on display 52 in response to a user activating image control 50w. QR screen 150 includes a QR code 152. Further, in some embodiments, QR screen 150 may include an instruction 154 to scan the QR code 152 with a camera-equipped QR reader, such as tool 130.

The amount of data that may be conveyed in a conven-tional QR code varies with the particular mode (numeric, alphanumeric, binary/byte, etc.), version, and error correc-tion level of the QR code. For example, the numeric mode of the version 40 code with low error correction can store 7,089 characters. As another example, 4,296 alphanumeric characters may be stored in the version 40 code with low error correction levels. It will be understood that controller 60 may be configured to use any suitable QR code mode, version, and/or error correction level.

Figure 12:
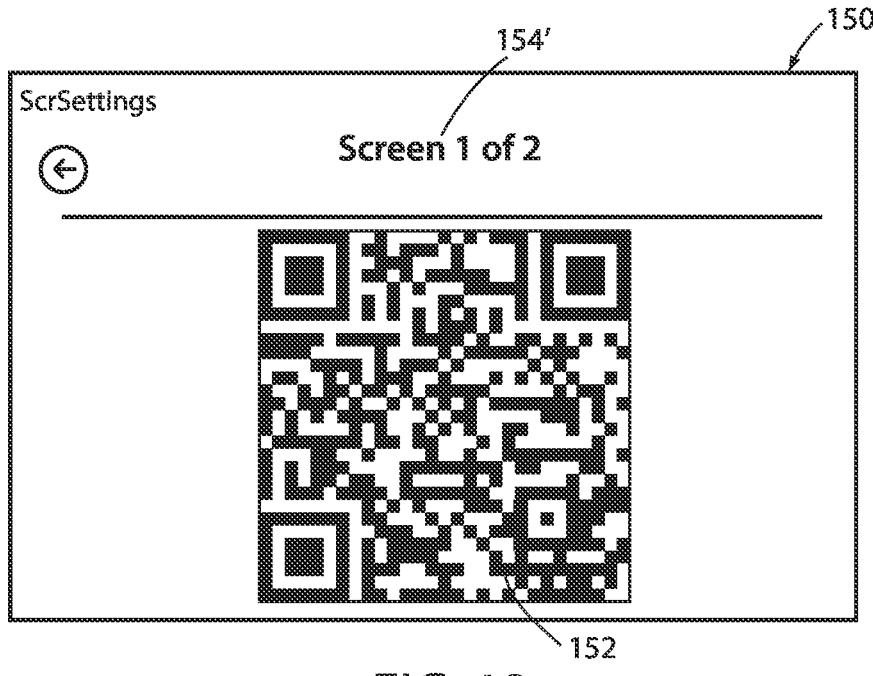
FIG. 12 is a second example of a coded image screen that may be displayed on the display of some embodiments of the patient support apparatuses of FIG. 1 or 6.

In those situations where batch of data 82 may exceed the number of characters that controller 60 is able to encode within a single QR code 152, controller 60 is configured to display multiple QR codes sequentially, such as shown in FIG. 12. FIG. 12 illustrates another example of a QR screen 150' that may be displayed on display 52 of patient support apparatus 20, 20' when the size of data batch 82 exceeds the maximum amount of data that can be encoded within a single QR code (or bar code, or other type of visual code). Thus, screen 150' includes an instruction 154' indicating that the QR code 152 displayed thereon is only the first one of two total QR codes in which data batch 82 is encoded. Thus, after the user captures an image of QR code 152 of FIG. 12 using camera 138 of tool 130, he or she presses on QR code 152, or another control on or adjacent to screen 150' (not shown), and controller 60 then displays a second QR code 152 that contains the data from the remaining portion of data batch 82. It will, of course, be understood that more than two QR codes 152 may be displayed by controller 60 if the size of data batch 82 exceeds the capacity of two QR codes 152. Further, it will be understood that screen 150' may be modified to include one or more navigation controls (not shown) to move back and forth between the multiple QR codes 152.

In addition to data batch 82, controller 60 is configured to encode serial number 80, or some other unique identifier of patient support apparatus 20, 20' within QR code 152. In those situations where data batch 82 exceeds the size of a single QR code 152, controller 60 may include serial number 80, or another unique identifier, in all of the multiple QR codes 152, or it may include the serial number or other identifier in only a single one of the multiple QR codes. The purpose of including the serial number 80, or other identifier, within the QR code 152 is to inform data collection tool 130 which patient support apparatus 20, 20' that data batch 82 was collected from. This is particularly useful when data collection tool 130 is used to collect batches of data 82 from multiple patient support apparatuses 20, 20'. By including serial number 80, or another unique identifier, within the QR code 152, data collection tool 130 is able to correlate the data from each data batch 82 to a particular patient support apparatus 20, 20'.

It will be understood that controller 60, in some embodiments, may be configured to assemble one or more portions of data batch 82 in response to the user's activation of image control 50w. In other words, in some embodiments, controller 60 may not have batch of data 82 completely pre-assembled at the time of activation of image control 50w. In such embodiments, in response to image control 50w being activated, controller 60 takes one or more readings and/or performs other activities to populate data batch 82. In some embodiments, controller 60 is configured to automatically select a set of the most recently gathered data items for inclusion within data batch 82. Thus, for example, if patient support apparatus 20, 20' have been used to take twenty patient readings, controller 60 may be configured to include within batch of data 82 only the five most recent patient weight readings, or some other subset of the entire set of patient weight readings. The same is true for other readings and/or data—i.e. only a most recent subset of the entire set of readings may be included within data batch 82. In other embodiments, however, controller 60 may be configured to include the entire set of readings for one or more of the various parameters that are included within data batch 82.

Data collection tool 130 is used by a person wishing to gather data from patient support apparatuses 20, 20' without having to physically connect a cable or wire to the patient support apparatuses 20, 20', as well as without having to establish or pair a radio connection between tool 130 and the patient support apparatuses 20, 20'. In general, data collection tool 130 is generally intended to be used with patient support apparatuses 20, 20' that do not have network transceivers 72 that enable them to communicate with a local area network, such as network 90. This is because data from such network-enabled patient support apparatuses generally are able to have their data collected automatically by a server (e.g. patient support apparatus server 94), or other electronic device, that is in communication with the network 90. Tool 130 is therefore primarily intended for use with such non-network-enabled patient support apparatuses. It will be understood, however, that tool 130 can, of course, be used, if desired, with patient support apparatuses 20, 20' that have network communication abilities.

Data collection using tool 130 is accomplished by a user first tapping, or double tapping, on an icon on the display of 136 of tool 130 that corresponds to data collection application 142, or by any other conventional means of starting a software application on an electronic device such as a smart phone, table computer, laptop computer, or other type of computer. Once started, application 142 instructs controller 132 to utilize camera 138 to capture an image of the QR 152 (or other type of visual) displayed on display 52 of patient support apparatus 20, 20' in response to the activation of image control 50w thereon. In some embodiments, application 142 instructs controller 132 to display one or more instructions on display 136 that instruct the user of data collection tool 130 to take a picture of the QR code 152 (or other type of code) displayed on the patient support apparatus using camera 138.

Once camera 138 has captured an image of the QR code 152 (or other type of code), controller 132 proceeds to decode the capture QR code image (or other type of coded image). As was mentioned previously, the QR code 152 encodes all or a portion of the data batch 82. Data collection application 142 also includes instructions for controller 132 to interpret the decoded data from the QR code 152. That is, once controller 132 has decoded the QR code, it uses the programming of data collection application 142 to determine what the decoded data corresponds to. In other words, data collection application 142 includes the same logic that is used by patient support apparatus 20, 20' uses to assemble data batch 82, thereby allowing controller 132 to determine the meaning of the decoded data. This logic defines what order the data is arranged within data batch 82, what fields are contained within data batch 82, and/or what other structures and/or formatting details are used with the data contained within data batch 82.

Figure 13:
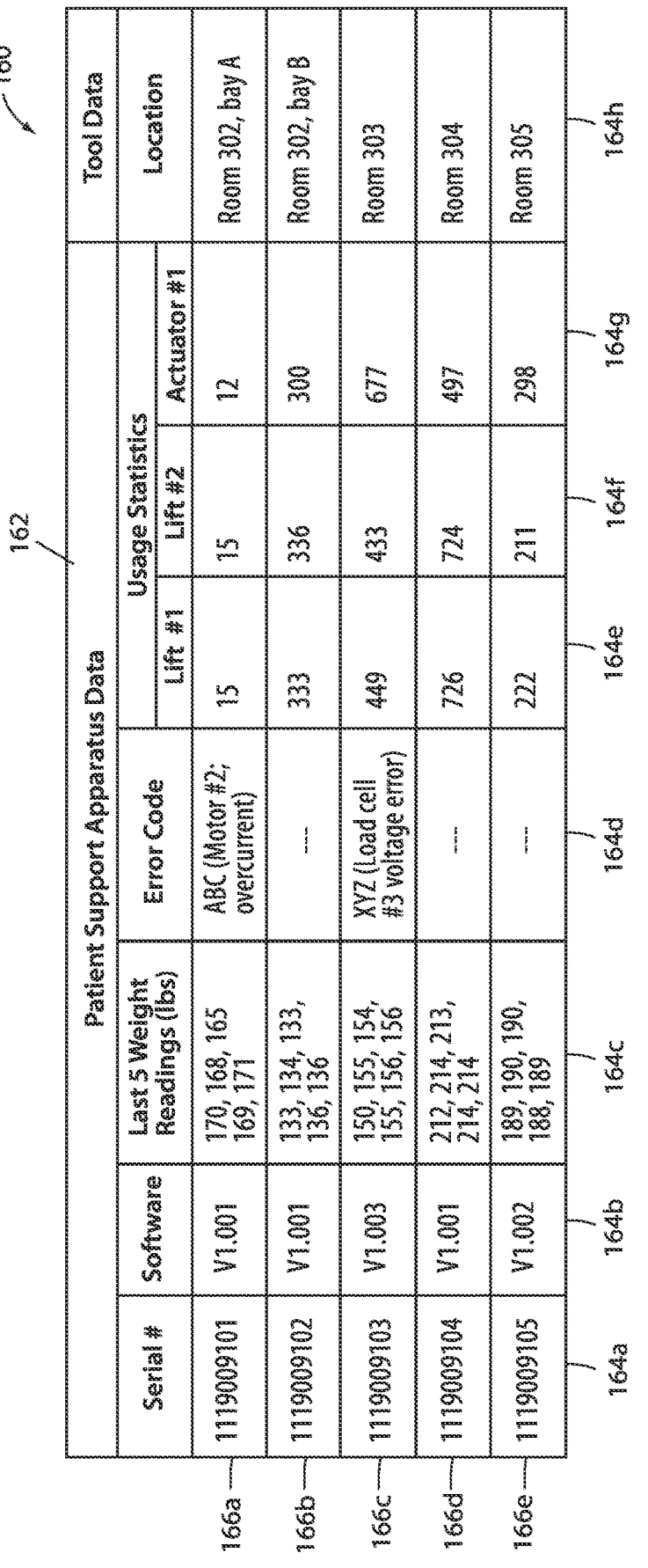
FIG. 13 is a table illustrating examples of the type of data that may be encoded in the images of FIGS. 11 and/or 12 and deciphered by a data collection tool.

In some embodiments, data collection application 142 may display the decoded data in a tabular form, such as shown in FIG. 13. FIG. 13 illustrates one example of the type of data that may be included with data batch 82, as well as one example of the manner in which this data may be displayed on display 136 of data collection tool 130. More specifically, FIG. 13 illustrates a sample data display screen 160 in which a data table 162 is displayed. Data table 162 includes a plurality of columns 164a-164j and a plurality of rows 166a-e. Each column 164 corresponds to a type of information that is stored within data batch 82, encoded within a coded image 152, and collected by data collection tool 130. Each row 166 represents a different patient support apparatus 20.

As can be seen in FIG. 13, column 164a identifies the serial number 80 of each patient support apparatus 20, 20' for which data has been collected using data collection tool 130. Column 164b identifies the current software version of that patient support apparatus. In some embodiments of patient support apparatuses 20, 20', multiple software versions may be present in different modules of the patient support apparatus, in which case column 164b may be expanded, and/or additional columns may be added, to include the current version of these additional software modules. Column 164c corresponds to the last five patient weight readings that were taken by scale 74 of the corresponding patient support apparatus 20, 20'.

Column 164d includes one or more errors codes that were generated by patient support apparatus 20, 20' during its operation. Data collection application 142, in some embodiments, may be programmed to interpret these error codes and offer explanatory information about the code within table 162. In other embodiments, data collection tool 130 may simply list the codes within column 164d without explanation.

Columns 164e, 164f, and 164g display usage statistics regarding three different actuators onboard the patient support apparatuses 20, 20'. In the example table 162 shown in FIG. 13, these three different actuators are the two lift actuators 64 and another actuator (e.g. gatch actuator 66 or fowler actuator 68). Further, in this particular example, these columns indicate the number of times that these actuators have been activated. It will be understood that other usage information besides the number of activations may be included within table 162, such as the cumulative distance that each actuator has traveled, the number of revolutions of the drive shaft of each actuator, the cumulative time that each actuators has been activated, the average current draw of the motors of each of the actuators, etc.

Column 164h lists the location of each patient support apparatus 20, 20' at the time data collection tool 130 was used to capture data batch 82 from each patient support apparatus 20, 20' (i.e. the time at which camera 138 was used to capture an image of QR code 152 of that particular patient support apparatus 20, 20'). Column 164*h* is generated in certain embodiments of data collection tool 130 that include one or more location sensors 144. Such location sensors 144 are used by data collection application 142 at the time the camera 138 captures the corresponding QR code 152 displayed on display 52 of the patient support apparatus 20, 20'. Such location sensors 144 provide the location data shown in column 164*h*. In other embodiments, data collection tool 130 may not include such location sensors 144, or it may not utilize them, in which case column 164*h* may be omitted from data table 162.

In some embodiments, location sensors 144 of data collection tool 130 may include one or more conventional location sensors that are built into conventional smart phones, tablets, or the like. For example, in some embodiments, when data collection tool 130 is a conventional smart phone that communicates with conventional cell towers, location sensors 144 may be conventional sensors that determine the location of data collection tool 130 using the signals transmitted between tool 130 and multiple cellular towers. Alternatively, or additionally, location sensors 144 may utilize WiFi signals to triangulate and/or trilaterate the position of data collection tool 130 with respect to the known location of one or more conventional wireless access points. As another option, location sensors 144 may utilize one or more Global Positioning System (GPS) sensors that determine location using communications received from multiple GPS satellites. Still further, in some embodiments, data collection tool 130 may be a smart phone, tablet, or other conventional computing device that includes Ultra-Wideband sensing technology for sensing its location to within centimeters. In such cases, location sensors 144 may include such ultra-wideband sensors and data collection application 142 may be configured to utilize the outputs of these sensors to populate the location data shown in column 164*h*.

Once data collection tool 130 has gathered data from one or more patient support apparatuses 20, 20', in addition to displaying this data, it may process the data and/or forward the data to one or more computers and/or servers for further processing. Such further processing may be utilized for maintenance records, service scheduling, statistical analysis, and/or other purposes.

From the foregoing description, it can be seen that the QR code 152, or other type of code, that is displayed on display 52 of patient support apparatuses 20, 20' is a dynamic code whose content (other than serial number 80) will change with time during the operation of the patient support apparatus. That is, as usage statistics and sensor readings are gathered, the content of data batch 82 is updated and populated, and ultimately encoded within a QR code 152. Further, in at least some embodiments, once a QR code has been displayed (or, in some cases, once a user has activated a control 50 onboard patient support apparatus 20, 20' indicating that he or she has captured the QR code with camera 138), controller 60 is configured in at least some embodiments to erase the contents of data batch 82 and begin re-populating it with fresh data.

Alternatively, controller 60, in at least some embodiments, may repetitively update data batch 82 in a Last In-First Out basis where, once batch of data 82 has received a set number of data readings of a particular parameter, it automatically deletes the oldest reading from data batch 82 when a new reading for that particular parameter is taken. In this manner, data batch 82 is repetitively updated with the latest data and automatically scrubbed of the most out-of-date data.

In other embodiments, controller 60 may be configured to store certain types of data until that data is collected by collection tool 130, no matter how much of that particular type of data is gathered. Still further, of course, controller 60 may be configured to handle different types of data in different manners, such as treating some data in the Last In-First Out manner, retaining other types of data (no matter how much) until that type of data is collected by collection tool 130, and/or in other manners.

It will also be understood that various modifications to patient support apparatuses 20 and/or 20' may be made herein without departing from the above-described principles of operation. As one example, in those patient support apparatuses 20, 20' in which a healthcare facility identifier 78 is stored, and in which the patient support apparatus 20, 20' includes a network transceiver 72 (or other off-board communication structures), controller 60 may be configured to automatically send a message to patient support apparatus server 94 whenever a user changes the healthcare facility identifier 78 locally using one or more of control panels 54. Patient support apparatus server 94, in turn, may be configured to automatically send a message to one or more other computers, smart phones, and/or other devices, that indicates this change so that the correct personnel within the healthcare facility are notified of the change to the healthcare facility identifier 78, thereby allowing them to accept or rescind the change. Still other modifications are possible.

In addition, it will also be understood that, although FIGS. 3 and 10 illustrate serial number 80 and healthcare facility identifier 78 as being separate from batch of data 82, this is done merely for purposes of illustrating these various data items. In any of the embodiments disclosed herein, batch of data 82 may include one or more of the serial number 80 and/or healthcare facility identifier 78.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:
   a support surface adapted to support a person;
   a display;
   a plurality of controls;
   a network transceiver; and
   a controller in communication with the display, the network transceiver, and the plurality of controls, the controller adapted to perform the following: (a) display a home screen on the display after the patient support apparatus is initially powered on; (b) display a non-home screen on the display in response to a user activating at least one of the plurality of controls on the patient support apparatus; (c) automatically return to displaying the home screen after displaying the non-home screen in response to a lack of activation of the plurality of controls; (d) display an identifier of the patient support apparatus on the home screen, the identifier identifying a designated part of a healthcare facility to which the patient support apparatus has been assigned by an administrator of the healthcare facility; (e) leave the identifier unchanged in response to the patient support apparatus being moved out of the designated part of the healthcare facility; and (f) change the identifier in response to receiving a message from a healthcare facility computer network via the network transceiver.

2. The patient support apparatus of claim 1 wherein the designated part of the healthcare facility corresponds to at least one of the following: a department of the healthcare facility to which the patient support apparatus is assigned; a floor of a multi-floor building to which the patient support apparatus is assigned; a healthcare facility building to which the patient support apparatus is assigned; a wing of the healthcare facility to which the patient support apparatus is assigned; a healthcare facility name; or a wing of a building to which the patient support apparatus is assigned.

3. The patient support apparatus of claim 1 wherein the controller is adapted to change the identifier only in response to receiving the message from the healthcare facility computer network via the network transceiver, and the patient support apparatus includes no controls onboard adapted to allow the user to change the identifier.

4. The patient support apparatus of claim 1 further comprising a memory, wherein the controller is adapted to collect a batch of data regarding operation of the patient support apparatus, to store the batch of data in the memory, to update a content of the batch of data during usage of the patient support apparatus, and to display a coded image on the display in response to activation of an image control, wherein the image control is one of the plurality of controls and the coded image encodes the batch of data.

5. The patient support apparatus of claim 4 wherein the memory further includes a unique identifier associated with the patient support apparatus and wherein the controller is further adapted to encode the unique identifier in the coded image.

6. The patient support apparatus of claim 5 wherein the unique identifier corresponds to a serial number of the patient support apparatus.

7. The patient support apparatus of claim 4 wherein the coded image is a Quick Response (QR) code.

8. The patient support apparatus of claim 4 further comprising a scale adapted to detect a weight of a patient supported on the support surface, and wherein the batch of data includes a plurality of weight readings from the scale.

9. The patient support apparatus of claim 8 wherein the controller is further adapted to automatically select the plurality of weight readings from a set of weight readings, wherein the plurality of weight readings corresponds to weight readings most recently taken in the set of weight readings.

10. The patient support apparatus of claim 4 further comprising a plurality of sensors, wherein the controller is further adapted to include sensor data derived from the plurality of sensors in the batch of data.

11. The patient support apparatus of claim 4 wherein the controller is further adapted to detect a fault in an operation of the patient support apparatus and to include fault data in the batch of data.

12. A patient support apparatus comprising:
a support surface adapted to support a person;
a display;
a memory;
a plurality of controls;
a network transceiver adapted to communicate with a computer network of a healthcare facility in which the patient support apparatus is positioned; and
a controller in communication with the display, the memory, the plurality of controls, and the network transceiver, the controller adapted to perform the following: (a) receive an identifier from the computer network via the network transceiver, wherein the identifier identifies a part of the healthcare facility to which the patient support apparatus has been assigned by an administrator of the healthcare facility; (b) store the identifier in the memory; (c) display the identifier on a particular screen shown on the display when the patient support apparatus is both located inside and outside of the part of the healthcare facility; and (d) change the identifier in response to a user activating at least a subset of the plurality of controls in a predetermined combination, wherein the patient support apparatus does not display the predetermined combination on the display or elsewhere on the patient support apparatus.

13. The patient support apparatus of claim 12 wherein the particular screen is a home screen and the controller is further configured to perform the following: (1) at least occasionally display the home screen automatically without requiring the user to manually navigate to the home screen; (2) display a non-home screen on the display in response to a user activating at least one of the plurality of controls on the patient support apparatus; and (3) to automatically return to displaying the home screen after displaying the non-home screen in response to a lack of activation of the plurality of controls.

14. The patient support apparatus of claim 12 wherein the particular screen includes data identifying a level of charge in a battery onboard the patient support apparatus.

15. The patient support apparatus of claim 12 wherein the part of the healthcare facility to which the patient support apparatus has been assigned includes at least one of the following: a department, a floor, a building, a wing, or a name of the healthcare facility.

\* \* \* \* \*